United States Patent
Mitsubori

(10) Patent No.: US 10,078,477 B2
(45) Date of Patent: Sep. 18, 2018

(54) IMAGE PROCESSING APPARATUS, NON-TRANSITORY COMPUTER-READABLE STORAGE MEDIUM STORING IMPOSITION CONTROL PROGRAM, AND IMPOSITION CONTROL METHOD

(71) Applicant: Konica Minolta, Inc., Tokyo (JP)

(72) Inventor: Toshiyuki Mitsubori, Kawasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/608,122

(22) Filed: May 30, 2017

(65) Prior Publication Data

US 2017/0351466 A1    Dec. 7, 2017

(30) Foreign Application Priority Data

Jun. 2, 2016    (JP) ................. 2016-110716

(51) Int. Cl.
*H04N 1/04*   (2006.01)
*G06F 3/12*   (2006.01)
*H04N 1/00*   (2006.01)

(52) U.S. Cl.
CPC ............ *G06F 3/125* (2013.01); *G06F 3/1204* (2013.01); *G06F 3/1219* (2013.01); *G06F 3/1257* (2013.01); *G06F 3/1262* (2013.01); *G06F 3/1282* (2013.01); *G06F 3/1285* (2013.01); *H04N 1/00411* (2013.01)

(58) Field of Classification Search
CPC ...... G06F 3/125; G06F 3/1204; G06F 3/1262; G06F 3/1282
USPC ............................................. 358/1.13, 1.14
See application file for complete search history.

(56) References Cited

U.S. PATENT DOCUMENTS

| | | | |
|---|---|---|---|
| 8,830,491 B2* | 9/2014 | Sato ...................... | G06F 3/1205 358/1.13 |
| 2003/0020956 A1* | 1/2003 | Goel ...................... | G06K 15/02 358/1.18 |

FOREIGN PATENT DOCUMENTS

| | | |
|---|---|---|
| EP | 2640053 A2 | 9/2013 |
| JP | 2012-141668 | 7/2012 |
| WO | WO 2001/016790 A1 | 3/2001 |

OTHER PUBLICATIONS

European Patent Application No. 17173434.6; Extended Search Report; dated Oct. 17, 2017; 7 pages.

* cited by examiner

*Primary Examiner* — Houshang Safaipour
(74) *Attorney, Agent, or Firm* — Baker & Hostetler LLP

(57) ABSTRACT

Provided are an image processing apparatus, a non-transitory computer-readable storage medium storing an imposition control program, and an imposition control method. The hardware processor of the image processing apparatus is configured to impose plural print jobs. When imposing plural print jobs, the hardware processor extracts plural job-imposition layouts suitable for imposing the print jobs from a table stored in a storage unit. The hardware processor calculates the number of blank pages to be given after laying out pages of the print jobs with each of the job-imposition layouts extracted, and determines specific job-imposition layouts with which a smaller number of blank pages are given among the job-imposition layouts extracted. The hardware processor uses a display unit to display the specific job-imposition layouts so as to allow a user to choose a job-imposition layout to be used for imposing the print jobs.

18 Claims, 20 Drawing Sheets

FIG. 11

| NUMBER OF JOBS TO BE IMPOSED ON EACH SHEET || EXAMPLES OF JOB-IMPOSITION LAYOUT ||
|---|---|---|---|
| 1ST SHEET | 2ND SHEET | 1ST SHEET | 2ND SHEET |
| 2 | — | A B | |
| 1 | 1 | A A | B B |

FIG. 12

| NUMBER OF JOBS TO BE IMPOSED ON EACH SHEET | | | | EXAMPLES OF JOB-IMPOSITION LAYOUT | | | |
|---|---|---|---|---|---|---|---|
| 1ST SHEET | 2ND SHEET | 3RD SHEET | 4TH SHEET | 1ST SHEET | 2ND SHEET | 3RD SHEET | 4TH SHEET |
| 4 | — | — | — | A B / A C D | — | — | — |
| 3 | 1 | — | — | A A / B C | D D / D D | — | — |
| 2 | 2 | — | — | A A / B B | C C / C D | — | — |
| 2 | 1 | 1 | — | A A / B B | C C / C C | D D / D D | — |
| 1 | 1 | 1 | 1 | A A / A A | B B / B B | C C / C C | D D / D D |

FIG. 13A
☐ : JOB A
▨ : JOB B
▨ : JOB C
▨ : JOB D
| NUMBER OF JOBS | | | | EXAMPLES OF JOB-IMPOSITION LAYOUT | | | |
|---|---|---|---|---|---|---|---|
| 1ST | 2ND | 3RD | 4TH | 1ST SHEET | 2ND SHEET | 3RD SHEET | 4TH SHEET |
| 4 | - | - | - |  | - | - | - |
| 3 | 1 | - | - |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| 2 | 2 | - | - |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |
| | | | |  |  | - | - |

| NUMBER OF JOBS | | | | | | EXAMPLES OF JOB-IMPOSITION LAYOUT | | | | | |
|---|---|---|---|---|---|---|---|---|---|---|---|
| 1ST | 2ND | 3RD | 4TH | 5TH | 6TH | 1ST SHEET | 2ND SHEET | 3RD SHEET | 4TH SHEET | 5TH SHEET | 6TH SHEET |
| 6 | - | - | - | - | - | | | | | | |
| 5 | 1 | - | - | - | - | | | | | | |
| 4 | 2 | - | - | - | - | | | | | | |
| 4 | 1 | 1 | - | - | - | | | | | | |
| 3 | 3 | - | - | - | - | | | | | | |
| 3 | 2 | 1 | - | - | - | | | | | | |
| 3 | 1 | 1 | 1 | - | - | | | | | | |
| 2 | 2 | 2 | - | - | - | | | | | | |
| 2 | 2 | 1 | 1 | - | - | | | | | | |
| 2 | 1 | 1 | 1 | 1 | - | | | | | | |
| 1 | 1 | 1 | 1 | 1 | 1 | | | | | | |

☐ : JOB A
▦ : JOB B
■ : JOB C
▩ : JOB D
▨ : JOB E
▨ : JOB F

FIG. 15
| 1ST SHEET | 2ND SHEET | 3RD SHEET | 4TH SHEET | 5TH SHEET | 6TH SHEET |
|---|---|---|---|---|---|
| 6 | | | | | |
| 5 | 1 | | | | |
| 4 | 2 | | | | |
| 4 | 1 | 1 | | | |
| 3 | 3 | | | | |
| 3 | 2 | 1 | | | |
| 3 | 1 | 1 | 1 | | |
| 2 | 2 | 2 | | | |
| 2 | 2 | 1 | 1 | | |
| 2 | 1 | 1 | 1 | 1 | |
| 1 | 1 | 1 | 1 | 1 | 1 |
 : 2-JOB, 2-UP IMPOSITION
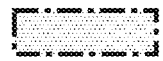 : 4-JOB, 4-UP IMPOSITION
 : 6-JOB, 6-UP IMPOSITION
FIG. 16A  FIG. 16B  FIG. 16C
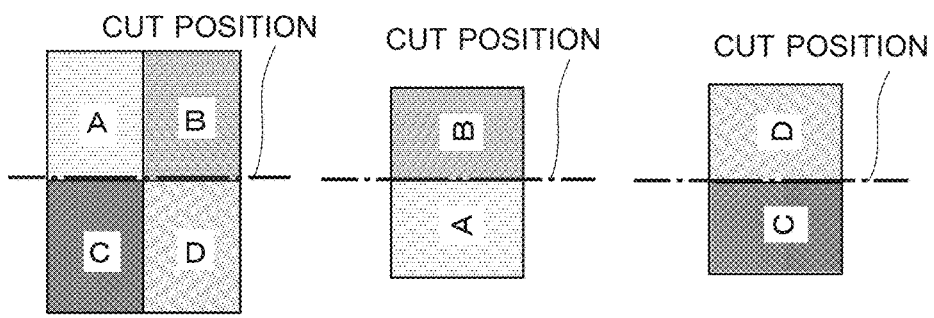

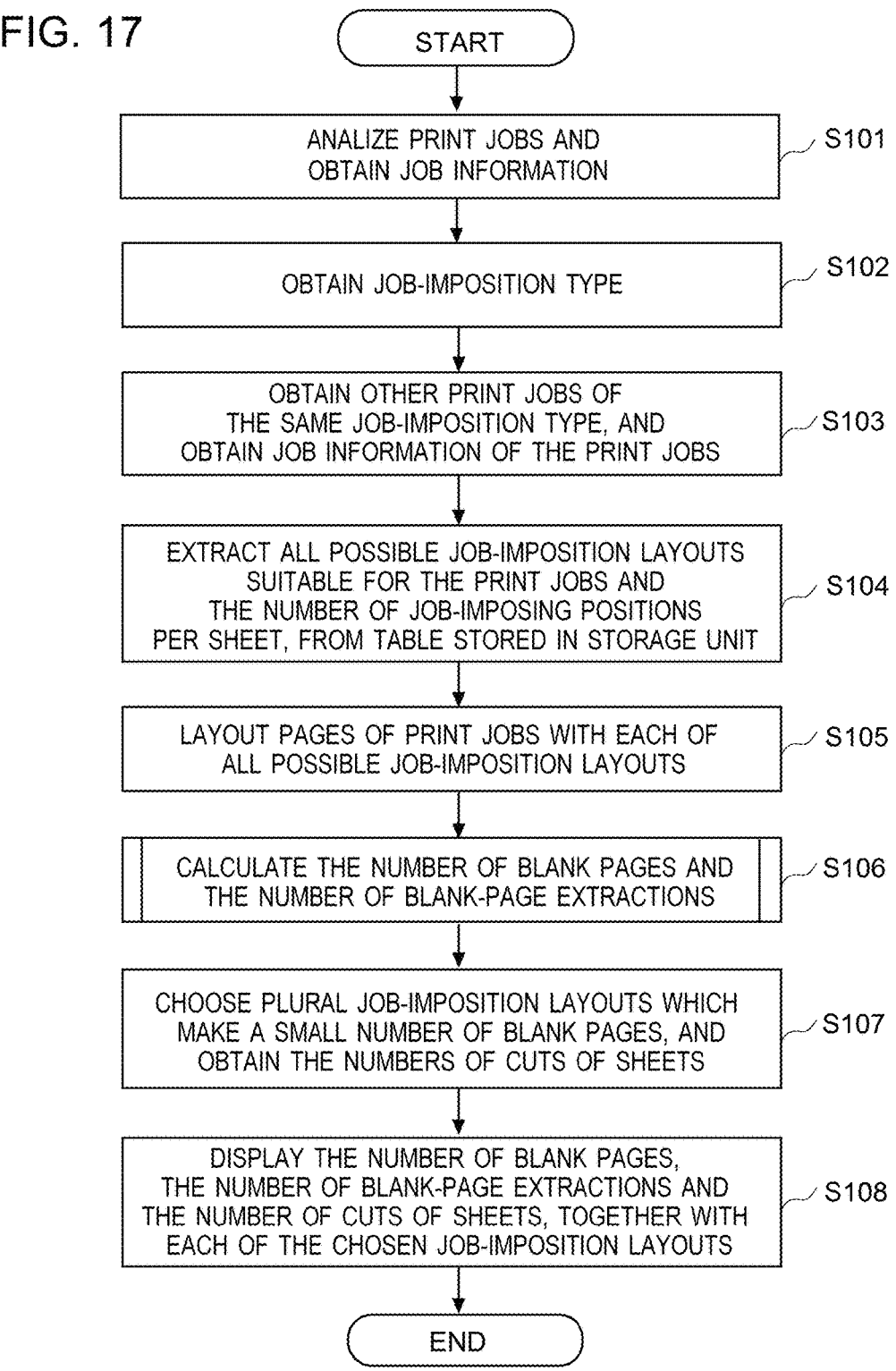

FIG. 19

|  | PRINT JOB | NUMBER OF PAGES PER POSITION | NUMBER OF SHEETS FOR PRINTING | NUMBER OF BLANK PAGES |
|---|---|---|---|---|
| SHEET 1<br>A B<br>C D | PRINT JOB A<br>PRINT JOB B<br>PRINT JOB C<br>PRINT JOB D | 200/1 = 200<br>150/1 = 150<br>65/1 = 65<br>45/1 = 45 | 200 | 0<br>50<br>135<br>155 |
| TOTAL | 340 BLANK PAGES, 3 BLANK-PAGE EXTRACTIONS, 3 CUTS | | | |

FIG. 20

|  | PRINT JOB | NUMBER OF PAGES PER POSITION | NUMBER OF SHEETS FOR PRINTING | NUMBER OF BLANK PAGES |
|---|---|---|---|---|
| SHEET 1<br>B B<br>C D | PRINT JOB B<br>PRINT JOB C<br>PRINT JOB D | 150/2 = 75<br>65/1 = 65<br>45/1 = 45 | 75 | 0<br>10<br>30 |
| SHEET 2<br>A A<br>A A | PRINT JOB A | 200/4 = 50 | 50 | 0 |
| TOTAL | 40 BLANK PAGES, 2 BLANK-PAGE EXTRACTIONS, 6 CUTS | | | |

FIG. 21

|  | PRINT JOB | NUMBER OF PAGES PER POSITION | NUMBER OF SHEETS FOR PRINTING | NUMBER OF BLANK PAGES |
|---|---|---|---|---|
| SHEET 1 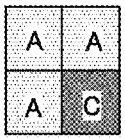 | PRINT JOB A<br>PRINT JOB C | 200/3 = 66.7<br>65/1 = 65 | 67 | 1<br>2 |
| SHEET 2 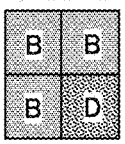 | PRINT JOB B<br>PRINT JOB D | 150/3 = 50<br>45/1 = 45 | 50 | 0<br>5 |
| TOTAL | 8 BLANK PAGES, 3 BLANK-PAGE EXTRACTIONS, 6 CUTS | | | |

FIG. 22

|  | PRINT JOB | NUMBER OF PAGES PER POSITION | NUMBER OF SHEETS FOR PRINTING | NUMBER OF BLANK PAGES |
|---|---|---|---|---|
| SHEET 1 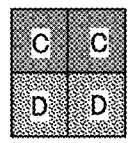 | PRINT JOB C<br>PRINT JOB D | 65/2 = 32.5<br>45/2 = 22.5 | 33 | 1<br>21 |
| SHEET 2 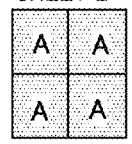 | PRINT JOB A | 200/4 = 50 | 50 | 0 |
| SHEET 3 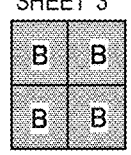 | PRINT JOB B | 150/4 = 37.5 | 38 | 2 |
| TOTAL | 24 BLANK PAGES, 5 BLANK-PAGE EXTRACTIONS, 9 CUTS | | | |

FIG. 23

| | PRINT JOB | NUMBER OF PAGES PER POSITION | NUMBER OF SHEETS FOR PRINTING | NUMBER OF BLANK PAGES |
|---|---|---|---|---|
| SHEET 1 <br> A A <br> A A | PRINT JOB A | 200/4 = 50 | 50 | 0 |
| SHEET 2 <br> B B <br> B B | PRINT JOB B | 150/4 = 37.5 | 38 | 2 |
| SHEET 3 <br> C C <br> C C | PRINT JOB C | 65/4 = 16.25 | 17 | 3 |
| SHEET 4 <br> D D <br> D D | PRINT JOB D | 45/4 = 11.25 | 12 | 3 |
| TOTAL | 8 BLANK PAGES, 8 BLANK-PAGE EXTRACTIONS, 12 CUTS | | | |

IMAGE PROCESSING APPARATUS, NON-TRANSITORY COMPUTER-READABLE STORAGE MEDIUM STORING IMPOSITION CONTROL PROGRAM, AND IMPOSITION CONTROL METHOD

This application claims priority under 35 U.S.C. § 119 to Japanese Patent Application No. 2016-110716, filed on Jun. 2, 2016. The entire disclosure of Japanese Patent Application No. 2016-110716, including its description, claims, drawings, and abstract, is incorporated herein by reference.

TECHNICAL FIELD

The present invention is directed to image processing apparatuses, non-transitory computer-readable storage media each storing an imposition control program, and imposition control methods. In particular, the present invention is directed to an image processing apparatus for use in a printing system which is configured to impose and print plural print jobs, a non-transitory computer-readable storage medium storing an imposition control program to be executed by a hardware processor of the image processing apparatus, and an imposition control method for use in the printing system.

BACKGROUND

Most of recent image forming apparatuses like MFPs (Multi-Functional Peripherals) have an imposition function to layout plural pages on one sheet. After printed sheets prepared by using the imposition function are cut into blocks of pages and then the pages are sorted, final printed products are produced. With the imposition function, it is capable of imposing multiple print jobs (referred to as ganging or ganging multiple print jobs), which allows a user to create final printed products of multiple print jobs with cost efficiency by printing multiple print jobs together on sheets with the imposition function and stacking and cutting the printed sheets together, as far as the location of cuts of the printed sheets are the same.

As an example of a technique to impose and print multiple print jobs, JP-A No. 2012-141668, which corresponds to United States Patent Application Publication No. US2012/0163891A1, discloses the following image forming apparatus. The image forming apparatus includes a main image forming section and an interleaf image forming section. The main image forming section imposes a plurality of jobs and generates at least one piece of main image data. The interleaf image forming section generates an interleaf image depending on the jobs of the main image data and generates interleaf image data including the interleaf image. The interleaf image forming section forms an image representing a color or pattern different from those of the jobs, in an area of the interleaf image data which corresponds to positions of side edges of the jobs of the main image data.

In ganging, which is a process of placing or imposing multiple print jobs at the respective positions on one surface of a sheet to impose the print jobs, the arrangement of the multiple print jobs is defined so that final printed products of the print jobs can be given after printing the print jobs on plural sheets and stacking and cutting the printed sheets together. When print jobs containing a different number of pages are imposed according to this arrangement, such an imposition makes a blank part (referred to as a blank page) at a position where a print job containing a fewer number of pages is assigned, on one or more imposed sheets, which causes waste of paper.

As one of conventional solutions for this matter, there is known a method of combining multiple print jobs into one print job and then imposing the resulting print job. This imposition method has the advantage of reducing useless blank pages but has the disadvantage of placing pages of two or more print jobs at the same job-imposing position on sheets in a mixed manner and therefore needing a complicated process of sorting the pages after cutting the sheets given after imposing and printing the multiple print jobs.

SUMMARY

The present invention is directed to image processing apparatuses, non-transitory computer-readable storage media each storing an imposition control program, and imposition control methods.

An image processing apparatus reflecting one aspect of the present invention is an image processing apparatus comprising: a storage unit, a display unit and a hardware processor. The storage unit stores a table including job-imposition layouts defined according to combinations of the number of print jobs to be imposed and the number of job-imposing positions per sheet. The hardware processor performs the following operations. The operations comprise receiving print jobs, and analyzing the print jobs to obtain job information of each of the print jobs, where the job information includes a job-imposition type specified for the each of the print jobs and the number of pages in the each of the print jobs. The operations further comprise imposing a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs. The imposing includes, using the table stored in the storage unit to extract from the table a plurality of job-imposition layouts suitable for imposing the plurality of print jobs of the same job-imposition type, and calculating the number of blank pages to be given after laying out pages of the plurality of print jobs with each of the plurality of job-imposition layouts extracted. The imposing further includes, determining specific job-imposition layouts the numbers of blank pages of which are smaller than the numbers of blank pages of the other job-imposition layouts, among the plurality of job-imposition layouts extracted, and using the display unit to display the specific job-imposition layouts so as to allow a user to choose a job-imposition layout to be used for imposing the plurality of print jobs, from the specific job-imposition layouts.

A non-transitory computer-readable storage medium reflecting one aspect of the present invention stores an imposition control program. The imposition control program comprises instructions which, when executed by a hardware processor of an image processing apparatus, cause the image processing apparatus to perform the following operations. The image processing apparatus includes a storage unit and a display unit and is configured to impose a plurality of print jobs and output data of print images of the plurality of print jobs, where the storage unit stores a table including job-imposition layouts defined according to combinations of the number of print jobs to be imposed and the number of job-imposing positions per sheet. The operations comprise analyzing print jobs to obtain job information of each of the print job, where the job information includes a job-imposition type specified for the each of the print jobs and the number of pages in the each of the print jobs. The operations further comprise imposing a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs. The imposing includes, using the table stored in the storage unit to extract from the table a plurality of job-imposition layouts suitable for imposing the plurality of print jobs of the same job-imposition type, and calculating the number of blank pages to be given after laying out pages of the plurality of print jobs with each of the plurality of job-imposition layouts extracted. The imposing further includes, determining specific job-imposition layouts the numbers of blank pages of which are smaller than the numbers of blank pages of the other job-imposition layouts, among the plurality of job-imposition layouts extracted, and using the display unit to display the specific job-imposition layouts so as to allow a user to choose a job-imposition layout to be used for imposing the plurality of print jobs, from the specific job-imposition layouts.

An imposition control method reflecting one aspect of the present invention is a method for use in a printing system. The printing system includes an image processing apparatus configured to impose a plurality of print jobs and output data of print images of the plurality of print jobs, and an image forming apparatus configured to perform printing on a basis of the data of print images. The image processing apparatus includes a storage unit and a display unit, where the storage unit stores a table including job-imposition layouts defined according to combinations of the number of print jobs to be imposed and the number of job-imposing positions per sheet. The method comprises analyzing, by the image processing apparatus, print jobs to obtain job information of each of the print job, where the job information includes a job-imposition type specified for the each of the print jobs and the number of pages in the each of the print jobs. The method further comprises imposing, by the image processing apparatus, a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs. The imposing includes using the table stored in the storage unit to extract from the table a plurality of job-imposition layouts suitable for imposing the plurality of print jobs of the same job-imposition type, and calculating the number of blank pages to be given after laying out pages of the plurality of print jobs with each of the plurality of job-imposition layouts extracted. The imposing further includes determining specific job-imposition layouts the numbers of blank pages of which are smaller than the numbers of blank pages of the other job-imposition layouts, among the plurality of job-imposition layouts extracted, and using the display unit to display the specific job-imposition layouts so as to allow a user to choose a job-imposition layout to be used for imposing the plurality of print jobs, from the specific job-imposition layouts.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 11 is a table of job-imposition layouts for a 2-job, 2-up imposition;

FIG. 12 is a table of job-imposition layouts for a 4-job, 4-up imposition;

FIGS. 13A and 13B are tables of all the possible job-imposition layouts for a 4-job, 4-up imposition;

FIG. 14 is a table of job-imposition layouts for a 6-job, 6-up imposition;

FIG. 15 is a table of the number of print jobs to be imposed on each of one or more sheets, for various types of job imposition;

FIGS. 16A, 16B and 16C are diagrams illustrating an example of a process of cutting printed sheets given after imposing and printing plural print jobs;

FIG. 17 is a flowchart illustrating an example of operations of the controller according to one embodiment of the present invention;

FIG. 19 is a diagram illustrating an example of a job-imposition layout for a 4-job, 4-up imposition;

FIG. 20 is a diagram illustrating another example of a job-imposition layout for a 4-job, 4-up imposition;

FIG. 21 is a diagram illustrating another example of a job layout-imposition for a 4-job, 4-up imposition;

FIG. 22 is a diagram illustrating another example of a job-imposition layout for a 4-job, 4-up imposition;

FIG. 23 is a diagram illustrating another example of a job-imposition layout for a 4-job, 4-up imposition.

DESCRIPTION OF THE PREFERRED EMBODIMENTS

Hereinafter, embodiments of the present invention will be described with reference to the drawings. However, the scope of the invention is not limited to the illustrated examples.

According to image processing apparatuses, non-transitory computer-readable storage media each storing an imposition control program, and imposition control methods as embodiments of the present invention, it is possible to perform ganging, which is a process of imposing multiple print jobs, with no need for a complicated sorting process after cutting sheets on which the multiple print jobs were imposed and printed and with a reduced number of blank pages, for the following reason.

That is because a hardware processor of an image processing apparatus is configured to (when executing an imposition control program) perform the following operations to place or impose a plurality of print jobs of the same job-imposition type, with a job-imposition layout which places the plurality of print jobs at job-imposing positions prepared on one or more sheets so that each of the job-imposing positions is not shared by two or more plurality of print jobs. That is, there is provided a table stored in a storage unit of the image processing apparatus, where the table includes job-imposition layouts defined according to combinations of the number of print jobs to be imposed and the number of job-imposing positions per sheet, and in the imposing process, the hardware processor extracts from the table a plurality of job-imposition layouts suitable for imposing the plurality of print jobs of the same job-imposition type (such as the number of job-imposing positions per sheet). The hardware processor then calculates the number of blank pages to be given after laying out pages of the plurality of print jobs with each of the plurality of job-imposition layouts extracted. The hardware processor determines specific job-imposition layouts the numbers of blank pages of which are smaller than the numbers of blank pages of the other job-imposition layouts, among the plurality of job-imposition layouts extracted. The hardware processor uses a display unit of the image processing apparatus to display the specific job-imposition layouts so as to allow a user to choose a job-imposition layout to be used for imposing the plurality of print jobs, from the specific job-imposition layouts.

Figure 1A:
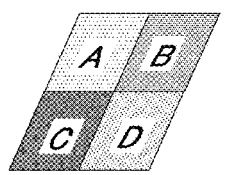
FIGS. 1A, 1B and 1C are schematic diagrams for illustrating an example of a conventional ganging process.
Figure 1B:
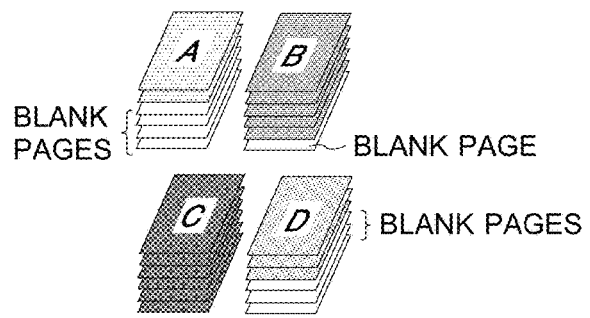
Figure 1C:
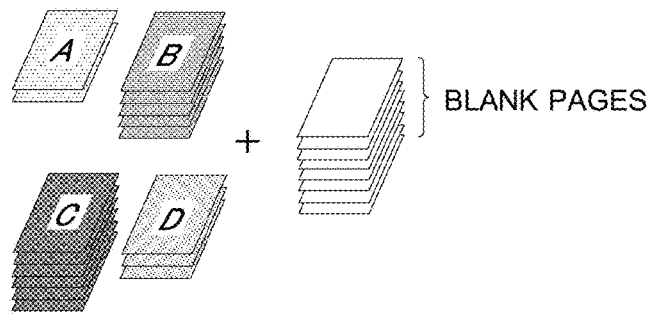

As described in BACKGROUND, in ganging, which is a process of placing or imposing multiple print jobs at the respective positions on one surface of a sheet and imposing the print jobs, the arrangement of the multiple print jobs is defined so that final printed products of the print jobs can be given after printing the print jobs on plural sheets and stacking and cutting the printed sheets together. However, an imposition with such a layout multiple print jobs, if the print jobs contain a different number of pages, makes a blank page at a position where a print job containing a fewer number of pages is assigned, on one or more sheets, which causes waste of paper. For example, consideration is given to the number of blank pages to be given after laying out pages of print jobs A to D with a job-imposition layout which places the print jobs A to D on one sheet as illustrated in FIG. 1A. In this and the following drawings, different print jobs (or pages of different print jobs) are represented by different hatchings. When print job A contains two pages, print job B contains five pages, print job C contains six pages and print job D contains three pages, an imposition of the print jobs A to D with the job-imposition layout needs six sheets for printing, which correspond to the number of pages in print job C containing the maximum number of pages. As can be seen from FIG. 1B, after these print jobs are imposed and printed on sheets, the imposed and printed sheets include four blank pages at the position where print job A is assigned, one blank page at the position where print job B is assigned, and three blank pages at the position where print job D is assigned. After the printed sheets are cut into blocks of pages of the print jobs and the pages are sorted, eight blank pages will be given together with the printed pages of the print jobs as illustrated in FIG. 1C.

Figure 2:
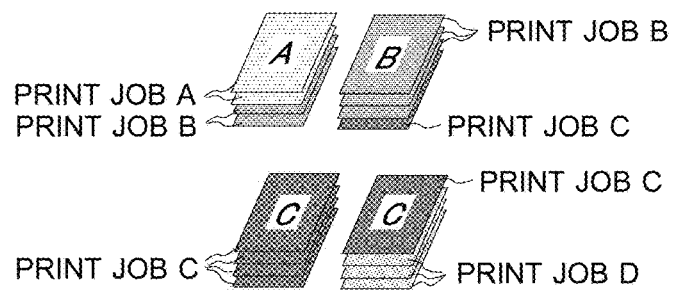
FIG. 2 is a schematic diagram for illustrating a conventional solution for a problem in the ganging process.

As one of conventional solutions for this matter, there is known a method of combining multiple print jobs into one print job and then imposing the resulting print job. For example, when the above-described print jobs A to D are imposed with this method, these print jobs will be printed and cut into blocks of pages as illustrated in FIG. 2. At the top left of printed sheets, two pages of print job A and subsequently two pages of print job B will be printed. At the top right of the printed sheets, the remaining three pages of print job B and subsequently one page of print job C will be printed. At the bottom left of the printed sheets, four pages of print job C will be printed. At the bottom right of the printed sheets, the remaining one page of print job C and subsequently three pages of print job D will be printed. This imposition method can reduce useless blank pages, but places pages of two or more print jobs at the same position on print sheets in a mixed manner and therefore needs a complicated process of sorting the pages after cutting the printed sheets.

In view of that, there is proposed a method of imposing plural print jobs so as to reduce useless blank pages and avoid a complicated sorting process after cutting imposed and printed sheets, as an embodiment of the present invention. In concrete terms, there is provided an image processing apparatus including a table of job-imposition layouts prepared in a storage unit in advance and a hardware processor configured to use the table to impose a plurality of print jobs of the same job-imposition type (when executing an imposition control program), where the table includes job-imposition layouts defined according to combinations of the number of print jobs to be imposed and the number of job-imposing positions per sheet (the n-up number). Each of the job-imposition layouts in the table places a plurality of print jobs at job-imposing positions prepared on one or more sheets. In these job-imposition layout, each print job can be placed or assigned at two or more job-imposing positions but each job-imposing position is not shared by two or more print jobs. Each of the job-imposition layouts may place a plurality of print jobs so as not to place one print job at plural job-imposing positions prepared on separated layout sheets (in other words, so as to when placing one print job at plural job-imposing positions, place the print job at plural job-imposing positions prepared on one layout sheet).

In the imposing process, the hardware processor of the image processing apparatus uses the table to extract from the table a plurality of job-imposition layouts suitable for imposing a plurality of print jobs of the same job-imposition type (like the number of job-imposing positions per sheet), and calculates the number of blank pages to be given after laying out pages of the plurality of print jobs with each of the plurality of job-imposition layouts extracted. The hardware processor of the image processing apparatus then determines specific job-imposition layouts the numbers of blank pages of which are smaller than those of the other job-imposition layouts, among the plurality of job-imposition layouts extracted, and use a display unit to display the specific job-imposition layouts so as to allow a user to choose a job-imposition layout to be used for imposing the plurality of print jobs, from the specific job-imposition layouts. For example, the hardware processor may determine plural job-imposition layouts on the basis of the number of blank pages, the number of cuts of imposed and printed sheets and the number of blank-page extractions, and may use the display unit to display the determined job-imposition layouts as possible job-imposition layouts to be used for imposing the plurality of print jobs, so as to allow a user to choose one of the determined job-imposition layouts. The determined job-imposition layouts may include a job-imposition layout such that the number of blank pages is the smallest among the extracted job-imposition layouts, and a job-imposition layout such that the number of blank pages is smaller than those of other job-imposition layouts and the number of cuts of imposed and printed sheets or the number of blank-page extractions is also smaller than those of other job-imposition layouts.

Figure 3A:
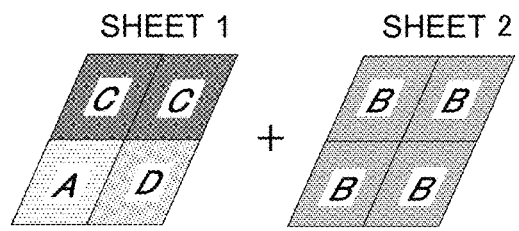
FIGS. 3A, 3B and 3C are schematic diagrams for illustrating an example of a method of ganging multiple print jobs according to one embodiment of the present invention.
Figure 3B:
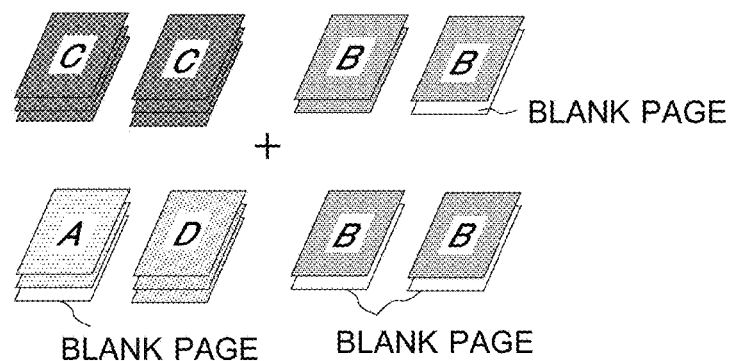
Figure 3C:
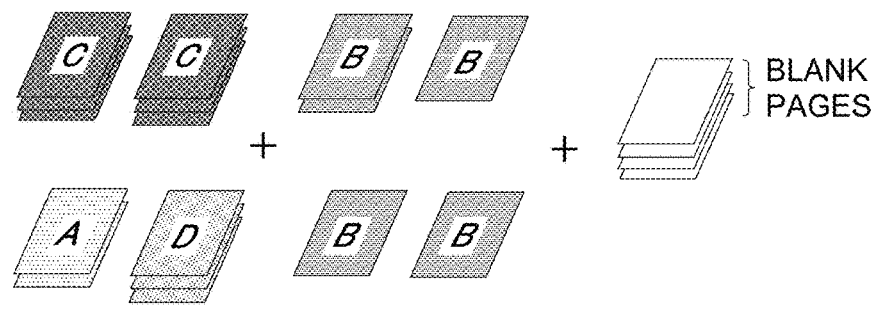

When placing the above-described print jobs A to D at job-imposing positions prepared on two layout sheets (two four-up layout sheets), as illustrated in FIG. 3A, the hardware processor of the image processing apparatus places only the print job B, which contains a maximum number of pages among the print jobs A to D, on one layout sheets (in the example of FIG. 3A, Sheet 2), and places the remaining print jobs A, C and D on the other layout sheet (in the example of FIG. 3A, Sheet 1) so as to place the print job C, which contains a maximum number of pages among the print jobs A, C and D, at two job-imposing positions on the layout sheet. In this job-imposition layout, Sheet 1 needs three print sheets for printing the print jobs and Sheet 2 needs two print sheets for printing the print job. As can be seen from FIG. 3B, when pages of the print jobs are laid out with the job-imposition layout, Sheet 1 makes one blank page at the job-imposing position where print job A is imposed, and Sheet 2 makes one blank page at each of three of the four job-imposing positions. After the printed sheets, on which the print jobs were printed with the above job-imposition layout, are cut into blocks of pages and the pages are sorted, four blank pages are given in total as illustrated in FIG. 3C. This job imposition can reduce the number of blank pages given after cutting and sorting processes, in comparison with the conventional job imposition method illustrated in FIGS. 1A to 1C. This method further can simplify a process of sorting pages of plural print jobs after cutting printed sheets into blocks of pages, since each of the job-imposing positions is occupied by pages of only one print job (in other words, each job-imposing position in the job-imposition layout is not shared with two or more print jobs).

EXAMPLES

Figure 4:
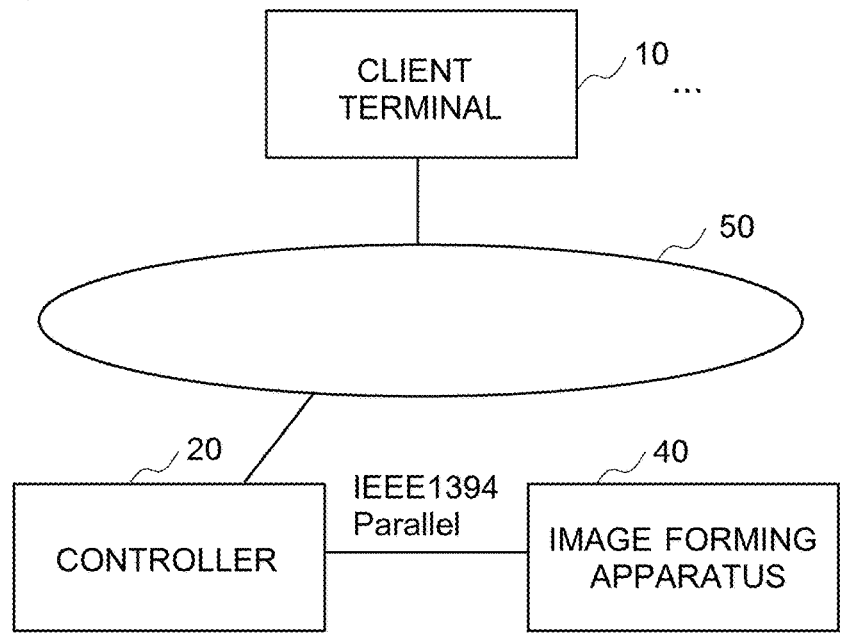
FIG. 4 is a schematic diagram illustrating an example of the constitution of a printing system according to one embodiment of the present invention.
Figure 5:
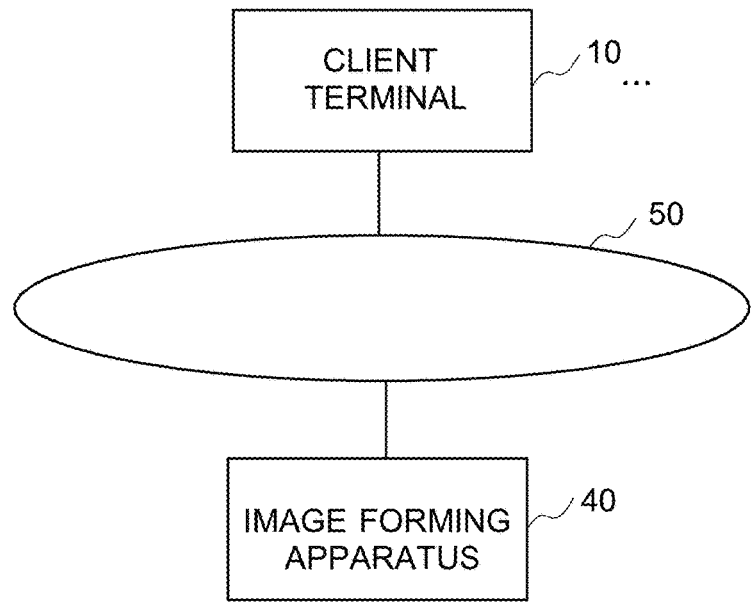
FIG. 5 is a schematic diagram illustrating another example of the constitution of a printing system according to one embodiment of the present invention.
Figure 6:
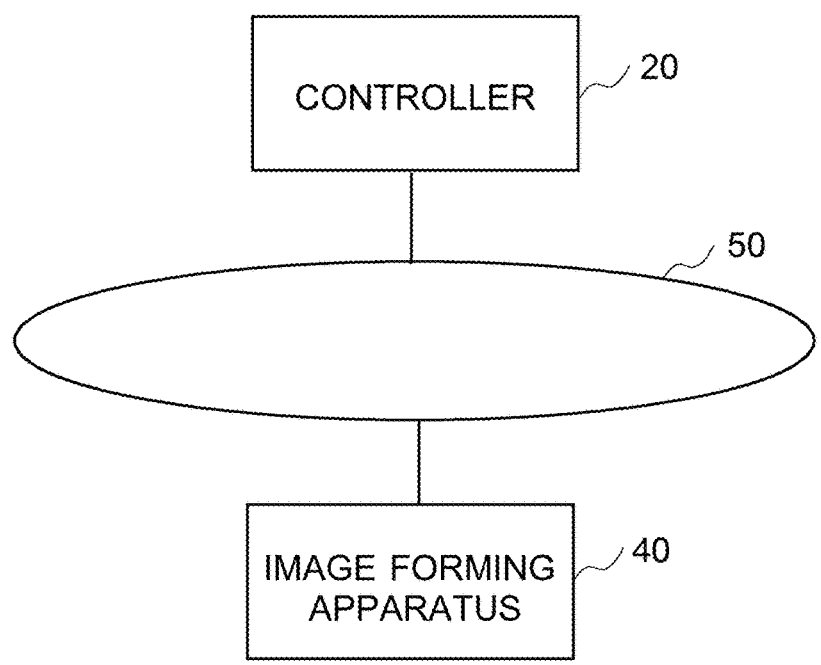
FIG. 6 is a schematic diagram illustrating another example of the constitution of a printing system according to one embodiment of the present invention.

In order to describe the above-mentioned embodiments of the present invention in more detail, a description is given to an image processing apparatus, a non-transitory computer-readable storage medium storing an imposition control program and an imposition control method according to one example of the present invention, with reference to FIG. 4 to FIG. 24. FIGS. 4 to 6 are schematic diagrams illustrating examples of a printing system according to the present example. FIGS. 7A to 9 are block diagrams illustrating a constitution example of a client terminal, a controller and an image forming apparatus according to the present example. FIG. 10 is a schematic diagram illustrating an example of an imposition control method according to the present example.

Figure 18:
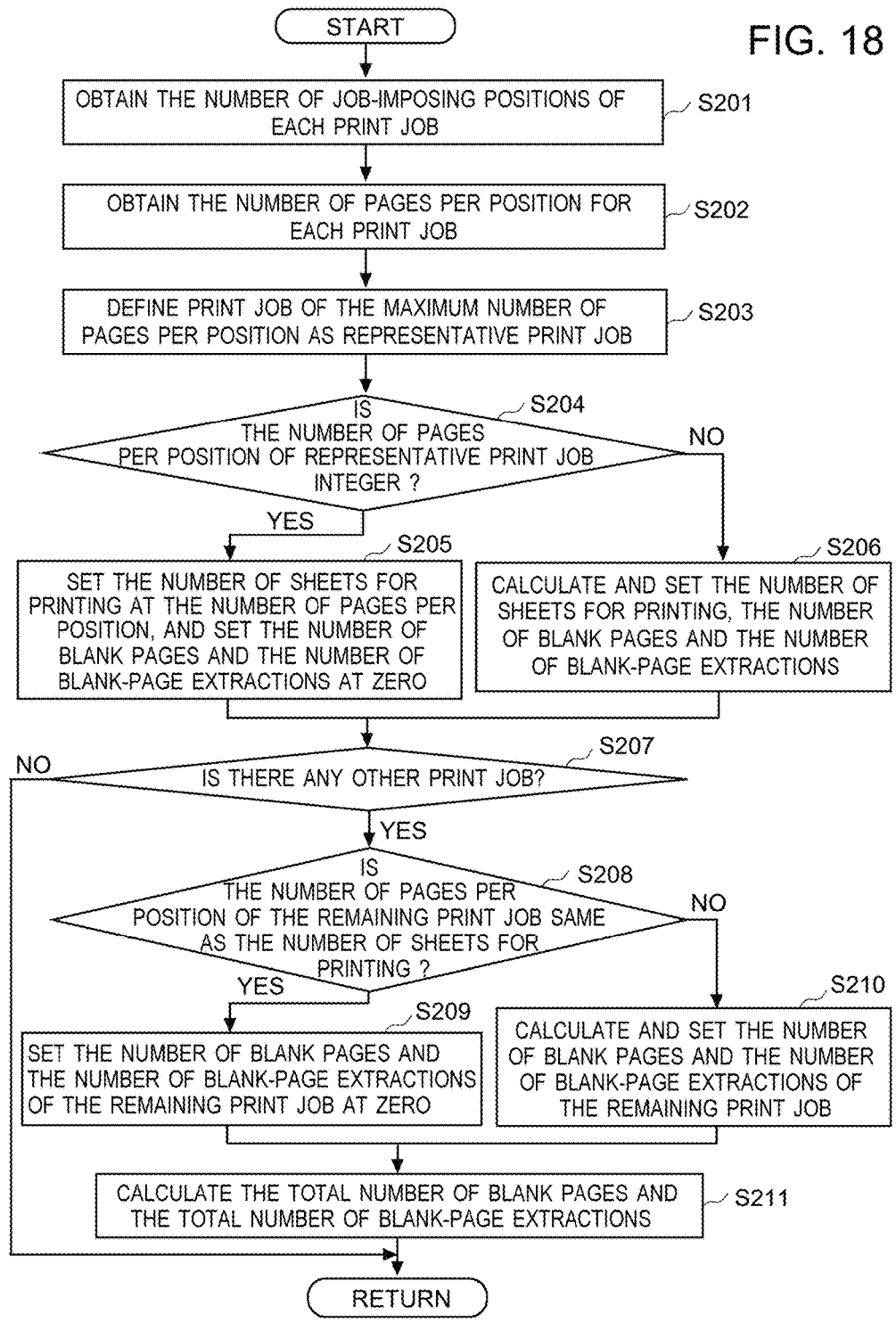
FIG. 18 is a flowchart illustrating an example of operations (calculation of the number of blank pages and the number of blank-page extractions) of the controller according to one embodiment of the present invention.
Figure 24:
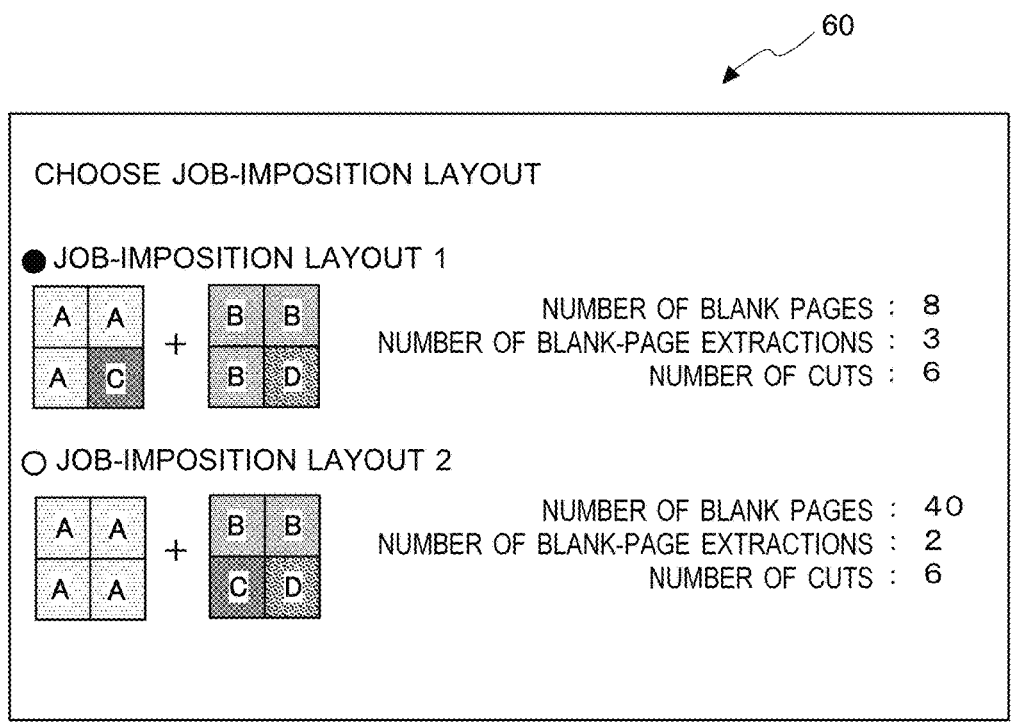
FIG. 24 is a diagram illustrating an example of an imposition control screen to be displayed with a display unit of the controller according to one embodiment of the present invention.

FIGS. 11 to 15 are tables of job-imposition layouts. FIGS. 16A, 16B and 16C are diagrams illustrating an example of a process of cutting printed sheets given after imposing and printing plural print jobs. Each of FIGS. 17 and 18 is a flowchart illustrating an example of operations of the controller according to the present example. Each of FIGS. 19 to 23 is a table of an example of a job-imposition layout. FIG. 24 is a diagram illustrating an example of an imposition control screen.

As illustrated in FIG. 4, a printing system of the present example includes one or more client terminals 10, controller 20 and image forming apparatus 40, which are located in an intranet so as to be communicably connected to each other via a communication network 50. As an example of the communication network 50, an Ethernet network may be used. Data transfer from controller 20 to image forming apparatus 40 may be performed through a system conforming to the standards, such as IEEE 1394, parallel or the like, in place of the Ethernet.

Though the example of the printing system shown in FIG. 4 is composed of one or more client terminals 10, controller 20 and image forming apparatus 40, the controller 20 may be omitted from the printing system as illustrated in FIG. 5 if client terminal 10 is configured to gang plural print job with a table of job-imposition layouts stored in storage unit 12; or the one or more client terminals 10 may be omitted from the printing system as illustrated in FIG. 6 if controller 20 is configured to gang plural print job prepared and stored in advance with a table of job-imposition layouts stored in storage unit 22 and give print instructions of the print jobs to image forming apparatus 40. Hereinafter, a description of each apparatus is given on the assumption of the structure of the printing system shown in FIG. 4.

Figure 7A:
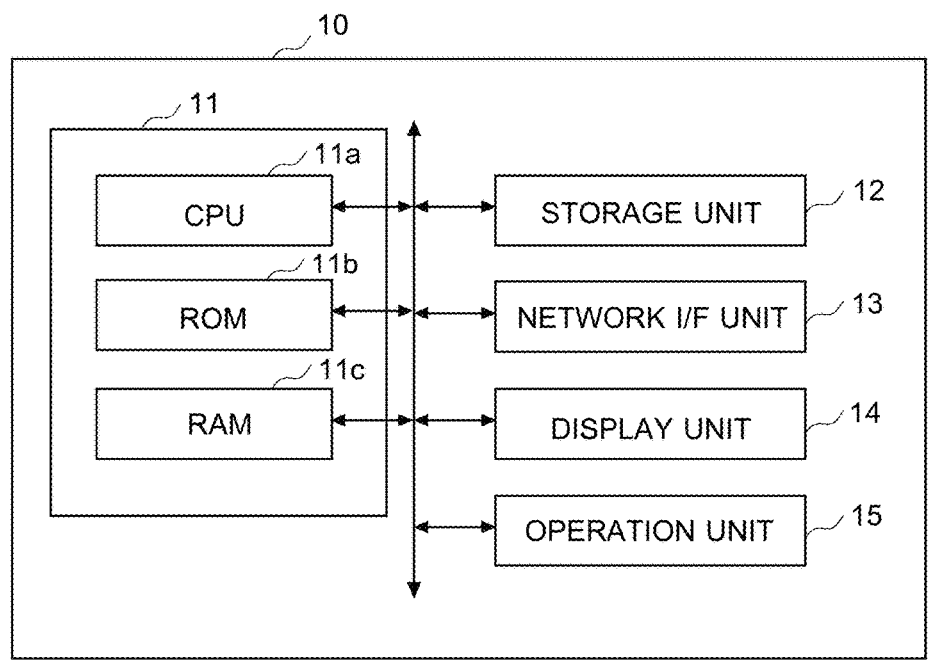
FIGS. 7A and 7B are block diagrams illustrating an example of the constitution of a client terminal and an example of programs to be executed by a control unit of the client terminal, according to one embodiment of the present invention.

Client Terminal:

Client terminal 10 is a computing device like a personal computer and is configured to create a print job and send the print job to controller 20. The client terminal 10 includes, as illustrated in FIG. 7A, control unit 11, storage unit 12, network interface (I/F) unit 13, display unit 14 and operation unit 15.

Figure 7B:
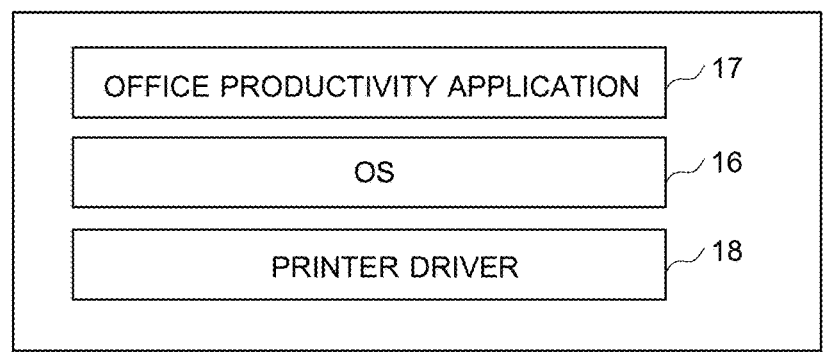

Control unit 11 includes a CPU (Central Processing Unit) 11a as a hardware processor, and memories, such as a ROM (Read Only Memory) 11b and a RAM (Random Access Memory) 11c. CPU 11a is configured to read control programs stored in ROM 11b or storage unit 12 to load the control programs onto RAM 11c, and then executes the control programs, thereby controlling the overall operations of client terminal 10. The control unit 11 (CPU 11a) is further configured to execute, as illustrated in FIG. 7B, OS (Operating System) 16, office productivity application 17 and printer driver 18 and other programs.

Examples of OS 16 include Windows, OS X, macOS and Android, where Windows is a registered trademark of Microsoft Corporation in the United States and/or other countries, OS X is a registered trademarks of Apple Inc. in the U.S. and other countries, macOS is a trademark of Apple Inc. in the U.S. and other countries, and Android is a trademark of Google Inc. in the United States and/or other countries. OS 16 manages office productivity application 17 and printer driver 18 in the client terminal 10 so as to function and run the programs.

Examples of office productivity application 17 include word processing, spreadsheet, and image processing programs, and the office productivity application 17. When instructing to print original data created by the productivity application 17, office productivity application 17 invokes printer driver 18 and transfers the original data to the printer driver 18.

Printer driver 18 converts original data created by office productivity application 17, into a print job written in a language that image forming apparatus 40 can interpret, where examples of the print job include PDL (Page Description Language) data written in page description languages, such as PJL (Printer Job Language), PS (PostScript) and PCL (Printer Control Language); and PDF (Portable Document Format) data. In this example, PDF data is used as a print job, and printer driver 18 adds, to the print job, JDF (Job Definition Format) print information (print ticket) including conditions for creating images and conditions for finishing processes which were set on a print setup screen of printer driver 18.

Storage unit 12 includes a memory, such as a HDD (Hard Disk Drive), a SSD (Solid State Drive) or the like, storing programs which, when being executed, cause CPU 11a to control components of client terminal 10, information about processing and functions of client terminal 10, original data created by office productivity application 17, print jobs created by printer driver 18 and other data.

Network I/F unit 13 includes a NIC (Network Interface Card) and/or a modem. The network I/F unit 13 communicably connects client terminal 10 to communication network 50, so as to send a print job to controller 20.

Display unit 14 includes a display like a LCD (Liquid Crystal Display) or an OEL (organic electroluminescence) display, and is configured to display an original creation screen of office productivity application 17, a print setup screen of printer driver 18, and others.

Operation unit 15 includes hardware devices, such as a mouse and a keyboard, and is configured to allow a user to perform various operations and instructions relating to creation of an original by using office productivity application 17 and setup of print conditions and finishing conditions by using printer driver 18.

Figure 8A:
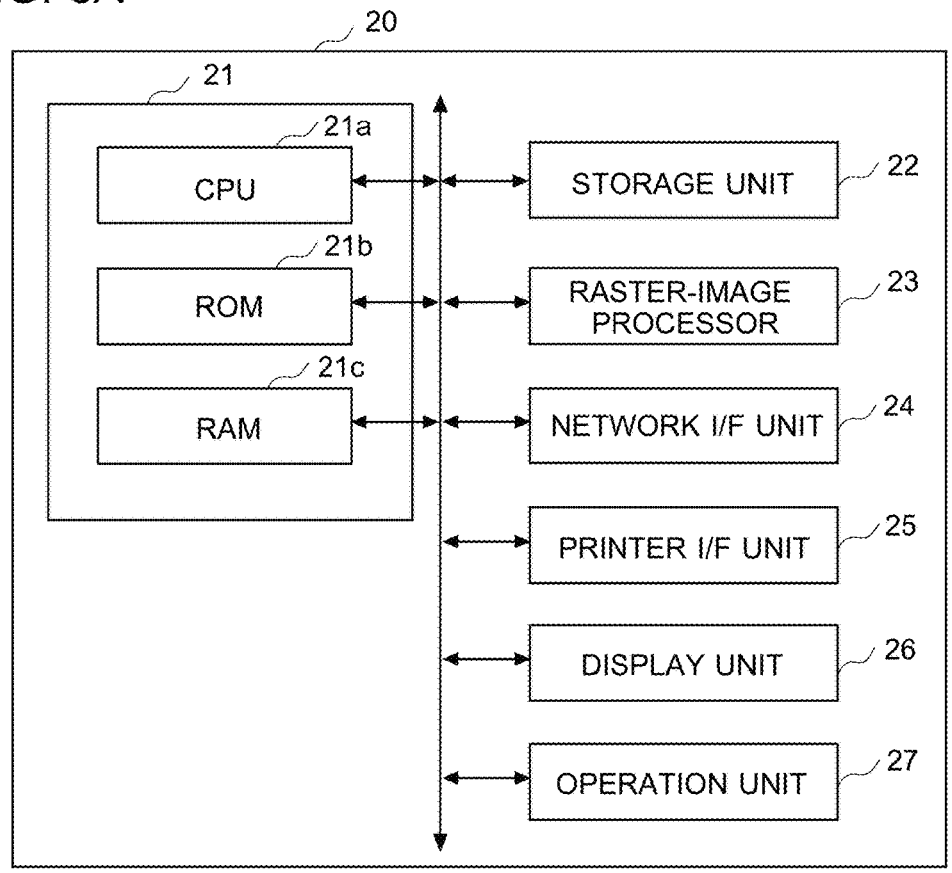
FIGS. 8A and 8B are block diagrams illustrating an example of the constitution of a controller according to one embodiment of the present invention.

Controller:

Controller 20 is an image processing apparatus configured to use a print job obtained from client terminal 10, and create, from the print job, data of print images to be used for printing the print job with image forming apparatus 40. Controller 20 includes, as illustrated in FIG. 8A, control unit 21, storage unit 22, raster-image processor 23 and network interface (I/F) unit 24, printer interface (I/F) unit 25, display unit 26 and an operation unit 27.

Figure 8B:
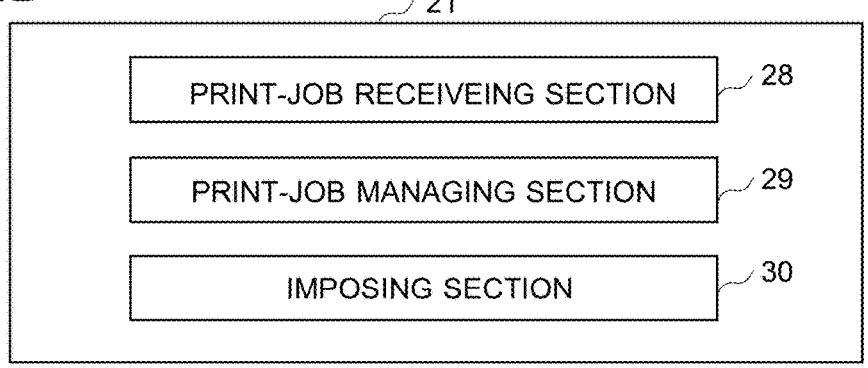

Control unit 21 includes CPU 21a as a hardware processor, and memories, such as ROM 21b and RAM 21c. CPU 21a reads control programs stored in the ROM 21b or storage unit 22 to load the control programs onto RAM 21c, and then executes the control programs, thereby controlling the overall operations of controller 20. The control unit 21 works also as print-job-receiving section 28, print-job managing section 29, imposing section 30, as illustrated in FIG. 8B.

Print-job-receiving section 28 is configured to receive a print job or print jobs from a device communicably connected to the controller 20, like client terminal 10 or an external storage.

Print-job managing section 29 is configured to analyze print jobs received with the print-job-receiving section 28 and obtain job information of each of the print jobs to manage the job information. The job information includes information about deadline for delivery, cost, job-imposition type (e.g. the n-up number) and the number of pages contained in a print job.

Imposing section 30 is configured to impose plural print jobs of the same job-imposition type so as to place the plural print jobs at job-imposing positions prepared on one or more sheets for job layout. In the job imposition, one and the same print job may be placed at two or more of the job-imposing positions but the print jobs should be laid out so that each of the job-imposing positions is not shared by two or more of the plural print jobs. Further, the print jobs may be laid out so that one and the same print job is placed at two or more of the job-imposing positions on one sheet (rather than two or more of the job-imposing positions on separated sheets). In concrete terms, imposing section 30 obtains plural print jobs of the same job-imposition type from print-job managing section 29 and uses a table which was prepared and stored in advance in storage unit 22 to extract plural job-imposition layouts suitable for imposing the plural print jobs. Imposing section 30 may further extract, from the job-imposition layouts suitable for imposing the plural print jobs, plural job-imposition layouts in which a print job containing a larger number of pages are placed at a larger number of job-imposing positions (in other words, plural job-imposition layouts each of which places a print job containing a larger number of pages at a larger number of job-imposing positions). Imposing section 30 then calculates the number of blank pages to be given after laying out pages of the plural print jobs with each of the job-imposition layouts extracted. On the basis of the numbers of blank pages calculated, imposing section 30 determines specific job-imposition layouts, where the specific job-imposition layouts are job-imposition layouts such that the numbers of blank pages are relatively small (in other words, job-imposition layouts the numbers of blank pages of which are smaller than those of the other job-imposition layouts), among the plural job-imposition layouts extracted. Imposing section 30 uses display unit 26 to display the specific job-imposition layouts so as to allow a user to choose one of the specific job-imposition layouts and prompt a user to select a job-imposition layout to be used for imposing the plural print jobs. On calculating the number of blank pages for each of the plural job-imposition layouts extracted in the above operations, imposing section 30 may further calculate the number of cuts of imposed and printed sheets and the number of blank-page extractions, for each of the job-imposition layouts extracted, and use display unit 26 to display the numbers of blank pages, the numbers of cuts and the numbers of blank-page extractions calculated for the specific job-imposition layouts, together with the specific job-imposition layouts, so as to allow a user to choose a job-imposition layout easily. The number of cuts is the number of times to cut printed sheets given after imposing and printing the plural print jobs with each of the job-imposition layouts extracted, needed for separating the imposed and printed sheets into blocks of printed pages of the plural print jobs. The number of blank-page extractions is the number of times to extract blank pages from the blocks.

Imposing section 30 obtains the number of blank pages and the number of blank-page extractions for each of the job-imposition layouts extracted, by the following calculation. Concrete examples of the calculation will be described below. For each of the job-imposition layouts extracted, imposing section 30 divides the number of pages in each of the plural print jobs with the number of job-imposing positions of the each of the plural print jobs (among job-imposing positions prepared on one or more sheets in the job-imposition layout), to obtain the number of pages per position for each of the plural print jobs. For each of the one or more sheets in the job-imposition layouts extracted, imposing section 30 chooses a print job such that the number of pages per position is the maximum among print jobs to be imposed or placed on the each of the one or more sheets, and defines the print job as a representative print job. For the representative print job defined for each of the one or more sheets, imposing section 30 sets the number of sheets for printing the representative print job, the number of blank pages and the number of blank-page extractions, according to whether or not the number of pages per position calculated for the representative print job is an integer. For each of the remaining print job or print jobs to be imposed or placed on the each of the one or more sheets, imposing section 30 sets the number of blank pages and the number of blank-page extractions, according to whether or not the number of pages per position calculated for the each of the remaining print job or print jobs is same as the number of sheets for printing the representative print job. After that, imposing section 30 calculates the total number of blank pages and the total number blank-page extractions for each of the job-imposition layouts extracted, by adding up the numbers of blank pages of the representative print job and the remaining print job or print jobs to be imposed or placed on each of the one or more sheets of the job-imposition layout and adding up the numbers of blank-page extractions of the representative print job and the remaining print job or print jobs to be imposed or placed on each of the one or more sheets of the job-imposition layout extracted.

In concrete terms, for the representative print job defined for each sheet, imposing section 30 sets the number of sheets for printing the representative print job, the number of blank pages and the number of blank-page extractions as follows. On judging that the number of pages per position calculated for the representative print job is an integer, imposing section 30 sets the number of sheets for printing the representative print job at the number of pages per position calculated for the representative print job, and sets each of the number of blank pages and the number of blank-page extractions at zero. On judging that the number of pages per position calculated for the representative print job is not an integer, imposing section 30 sets the number of sheets for printing the representative print job at a value given by rounding the number of pages per position calculated for the representative print job up to an integer, and sets each of the number of blank pages and the number of blank-page extractions at a value given by multiplying the number of job-imposing positions of the representative print job on the sheet by the number of sheets for printing the representative print job and subtracting from the multiplication result the number of pages in the representative print job. On the other hand, for each of the remaining print job or print jobs to be imposed or placed on each sheet, imposing section 30 sets the number of blank pages and the number of blank-page extractions as follows. On judging that the number of pages per position calculated for the each of the remaining print job or print jobs is the same as the number of sheets for printing the representative print job, imposing section 30 sets each of the number of blank pages and the number of blank-page extractions at zero. On judging that the number of pages per position calculated for the each of the remaining print job or print jobs is not the same as the number of sheets for printing the representative print job, imposing section 30 sets the number of blank pages at a value given by multiplying the number of job-imposing positions of the each of the remaining print job or print jobs on the sheet by the number of sheets for printing the representative print job and subtracting from the multiplication result the number of pages in the each of the remaining print job or print jobs. Imposing section 30 then sets the number of blank-page extractions on the basis of a judgement whether the number of blank pages of the each of the remaining print job or print jobs is greater than the number of job-imposing positions of the each of the remaining print job or print jobs on the sheet. On judging that the number of blank pages is greater than the number of job-imposing positions, imposing section 30 sets the number of blank-page extractions at the number of job-imposing positions of the each of the remaining print job or print jobs on the each of the one or more sheets. On judging that the number of blank pages is not greater than the number of job-imposing positions, imposing section 30 sets the number of blank-page extractions at the number of blank pages of the each of the remaining print job or print jobs.

The print-job-receiving section 28, print-job managing section 29, imposing section 30 may be constituted as hardware devices. Alternatively, the print-job-receiving section 28, print-job managing section 29, imposing section 30 may be provided by an imposition control program which causes controller 20 (in concrete terms, control unit 21) to function as these sections when being executed by CPU 21a. That is, the control unit 21 may be configured to serve as the print-job-receiving section 28, print-job managing section 29 and imposing section 30, when CPU 21a executes the imposition control program.

Storage unit 22 includes a memory, such as a HDD, a SSD or the like, storing programs which, when being executed, causes CPU 21a to control components of controller 20, print jobs, image data of pages created on the basis of a print job, a table of job-imposition layouts defined according to combinations of the number of print jobs to be imposed and the number of job-imposing positions per sheet. Each of the job-imposition layouts in the table places plural print jobs at job-imposing positions prepared on one or more sheets so that each of the job-imposing positions is not shared by two or more of the plural print jobs. In these job-imposition layout, each print job can be placed or assigned at two or more job-imposing positions. Each of the job-imposition layouts may place the plural print jobs so as not to place one print job at plural job-imposing positions prepared on separated layout sheets.

Raster-image processor 23 includes an image-processing ASIC (application specific integrated circuit) and is configured to perform the following operations. Raster-image processor 23 converts (rasterizes) pages of a print job obtained from client terminal 10 into bitmap data to create raster data. Raster-image processor 23 performs screening and image processing on the raster data if needed, and creates image data of pages of the print job. Raster-image processor 23 creates data of print images in which plural print job are imposed according to instructions of imposing section 30, and outputs the data to image forming apparatus 40.

Network I/F unit 24 includes a NIC and/or a modem. Network I/F unit 24 communicably connects controller 20 to communication network 50, so as to receive a print job or other data from client terminal 10. Printer I/F unit 25 is a dedicated interface for connecting controller 20 to image forming apparatus 40, so as to send data of print images or other data to image forming apparatus 40.

Display unit 26 includes a display like a LCD (Liquid Crystal Display) or an OEL (organic electroluminescence) display, and is configured to display a screen indicating plural job-imposition layouts determined by imposing section 30 (referred to as an imposition control screen) so as to allow a user to choose a job-imposition layout to be used for imposing the plural print jobs, from the job-imposition layouts.

Operation unit 27 includes hardware devices, such as a mouse and a keyboard, and is configured to allow a user to perform operations and instructions to choose a desired job-imposition layout among job-imposition layouts in an imposition control screen displayed on display unit 26.

Figure 9:
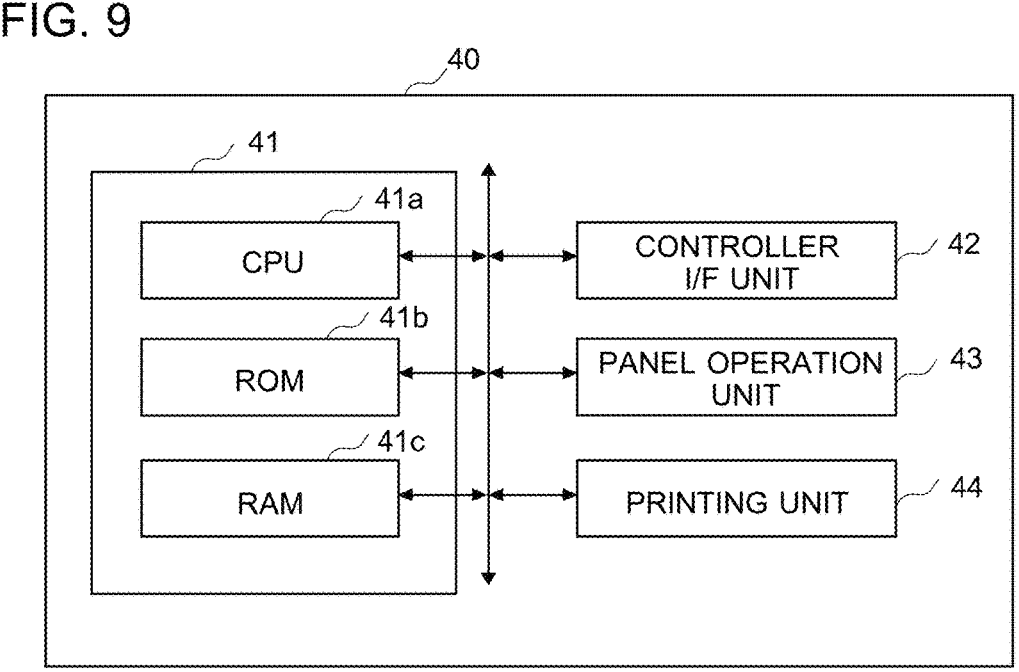
FIG. 9 is a block diagram illustrating an example of the constitution of an image forming apparatus according to one embodiment of the present invention.
Figure 10:
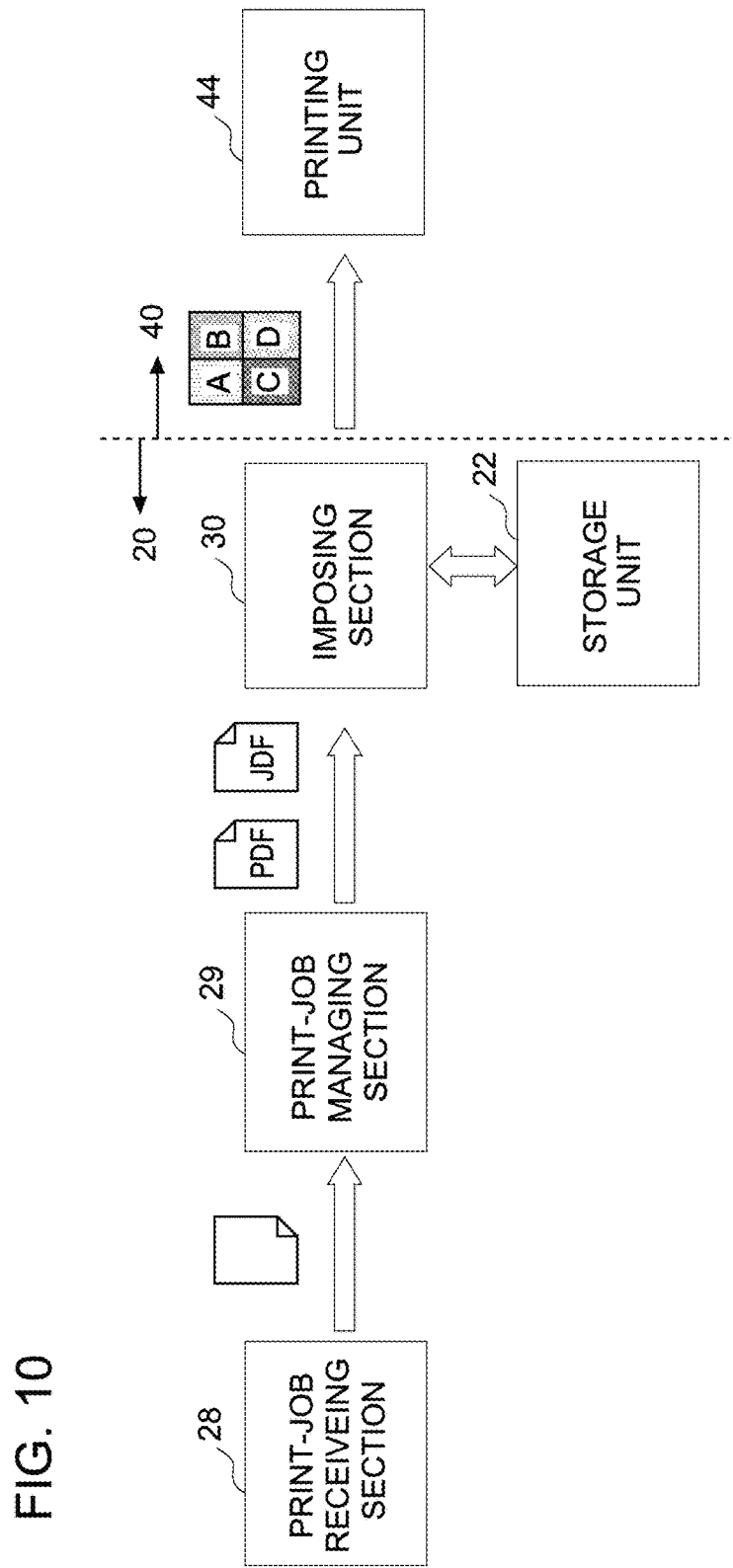
FIG. 10 is a schematic diagram illustrating an example of an imposition control method according to one embodiment of the present invention.

Image Forming Apparatus:

Image forming apparatus 40 is a device like a printer or a MFP, and includes, as illustrated in FIG. 9, control unit 41, controller interface (I/F) unit 42, panel operation unit 43 and printing unit (print engine) 44.

Control unit 41 includes CPU 41a as a hardware processor, and memories, such as ROM 41b a RAM 41c. CPU 41a is configured to read control programs stored in ROM 41b, loads the control programs onto RAM 41c, and executes the control programs, thereby controlling the overall operations of image forming apparatus 40.

Controller I/F unit 42 is a dedicated interface for connecting image forming apparatus 40 to controller 20, so as to receive data of print images and other data from controller 20.

Panel operation unit 43 is a device, such as a touch panel, which includes a display unit like a LCD and a touch sensor including transparent electrodes arranged in a lattice shape on the display unit. The panel operation unit 33 is configured to display various screens relating to printing and receive user's operation and instructions relating to printing.

Printing unit 44 is a print engine configured to perform printing by using data of print images. In concrete terms, in printing unit 44, an exposure unit irradiates a photoreceptor drum, which was charged by a charging unit, with a laser beam in accordance with an image, to form a latent image on the photoreceptor drum. A developing unit then develops the latent image by adhering charged toner onto the photoreceptor drum, and the developed toner image is transferred onto a transfer belt (first transfer processing), further is transferred from the transfer belt onto a sheet of paper (second transfer processing), and are fixed onto the sheet by a fixing unit.

It should be noted that FIG. 4 to FIG. 9 show a printing system and its components of the present example for illustrative purpose only, and the constitution and control of each apparatus in the system can be modified appropriately as long as the printing system can print plural print jobs on the basis of data of print images created by ganging or imposing the plural print jobs with a table of job-imposition layouts stored in a storage unit.

For example, the above-described printing system employs controller 20 which serves as an image processing apparatus for creating data of print images, and control unit 21 of the controller 20 is configured to work as the print-job-receiving section 28, print-job managing section 29 and imposing section 30 so as to impose plural print jobs with a table of job-imposition layouts stored in storage unit 22. Alternatively, in a printing system that employs client terminal 10 which serves as the image processing apparatus, control unit 11 of the client terminal 10 may be configured to work as the print-job managing section and imposing section so as to impose plural print jobs with a table of job-imposition layouts stored in storage unit 12 (in other words, CPU 11a may be configured to execute an imposition control program which is stored in storage unit 12 and causes the client terminal 10 or control unit 11 to function as these sections). In another printing system that employs image forming apparatus 40 which serves as the image processing apparatus equipped with a raster-image processor, control unit 41 of the image forming apparatus 40 may be configured to work as the print-job-receiving section, print-job managing section and imposing section so as to impose plural print jobs with a table of job-imposition layouts stored in ROM 41b (in other words, CPU 41a may be configured to execute an imposition control program which is stored in ROM 41b causes the forming apparatus 40 or control unit 41 to function as these sections).

Hereinafter, a schematic description is given of operations of the printing system having the above structure. As illustrated in FIG. 10, imposition control in the printing system of the present example is executed by mainly using print-job-receiving section 28 configured to receive print jobs from an external device communicably connected with controller 20; print-job managing section 29 configured to obtain information of the print jobs received to manage the information, imposing section 30 configured to impose plural print jobs; storage unit 22 that stores a table including job-imposition layouts defined according to combinations of the number of print jobs to be imposed and the number of job-imposing positions per sheet; and printing unit 44 configured to print the plural print jobs.

In response to print-job-receiving section 28 sending a print job or print jobs received from the external device to print-job managing section 29, the print-job managing section 29 analyzes the print job or print jobs to obtain job information of each print job (including information about deadline for delivery, cost, a job-imposition type and the number of pages) and manages the job information. Print-job managing section 29 then sends a PDF print job and JDF print information (job ticket) to imposing section 30.

Figure 13B:
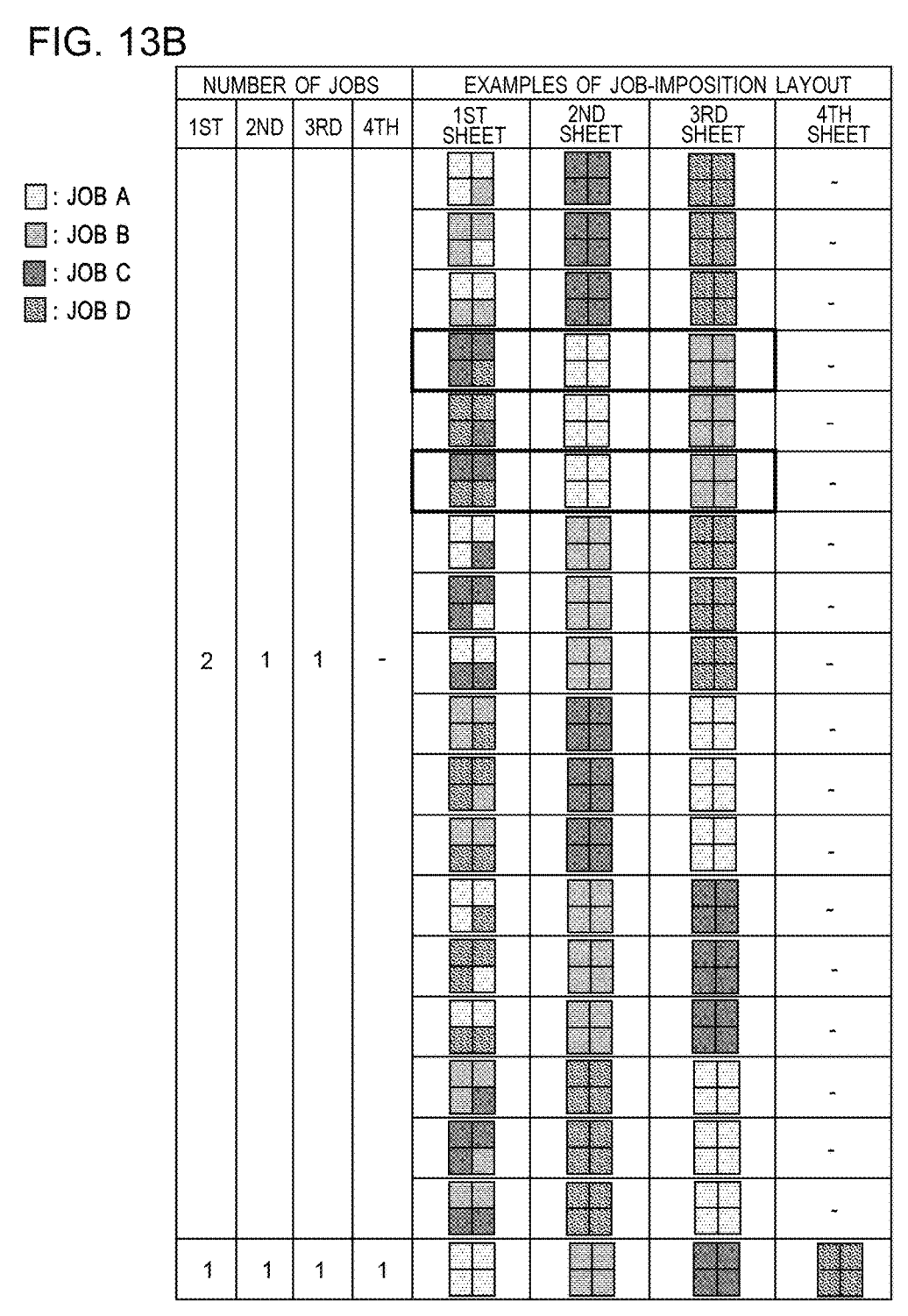

Imposing section 30 obtains the number of pages contained in the print job and the job-imposition type (e.g. the number of job-imposing positions per sheet) of the print job, on the basis of the JDF print information, and imposes, according to them, plural print jobs of the same job-imposition type. Imposing section 30 imposes the plural print jobs of the same job-imposition type, with a job-imposition layout which places the plural print jobs at job-imposing positions prepared on one or more sheets so that each of the job-imposing positions is not shared by two or more of the plural print jobs. In the imposition of the plural print jobs, imposing section 30 uses a table of job-imposition layouts prepared and stored in the storage unit 22 in advance, to extract from the table plural job-imposition layouts suitable for imposing the plural print jobs of the same job-imposition type. The table includes job-imposition layouts defined according to combinations of the number of print jobs to be imposed and the number of job-imposing positions per sheet. The imposing section 30 then calculates the number of blank pages to be given after laying out pages of the plural print jobs with each of the plural job-imposition layouts extracted. Examples of the job-imposition layouts defined according to combinations of the number of print jobs to be imposed and the number of job-imposing positions per sheet, are illustrated in FIGS. 11 to 14. FIG. 11 shows an example of job-imposition layouts for a 2-job, 2-up imposition (that is, job-imposition layouts each placing two print jobs of print jobs A and B on one or more sheets, where two job-imposing positions are prepared on each sheet). FIG. 12 shows an example of job-imposition layouts for a 4-job, 4-up imposition (that is, job-imposition layouts each placing four print jobs of print jobs A, B, C and D on one or more sheets, where four job-imposing positions are prepared on each sheet). FIG. 14 shows an example of job-imposition layouts for a 6-job, 6-up imposition (that is, job-imposition layouts each placing six print jobs of print jobs A, B, C, D, E and F on one or more sheets, where six job-imposing positions are prepared on each sheet). FIGS. 13A and 13B show all the possible job-imposition layouts for a 4-job, 4-up imposition (that is, job-imposition layouts each placing four print jobs of print jobs A, B, C and D on one or more sheets, where four job-imposing positions are prepared on each sheet). FIGS. 11 to 14 show, in the left part, the numbers of print jobs to be imposed (or placed) on each of the one or more sheets of the job-imposition layouts in the left part, and further show, in the right part, examples of the corresponding job-imposition layouts.

For example, when a 2-up imposition is specified for an obtained print job in the JDF print information, imposing section 30 further obtains print jobs for which a 2-up imposition is also specified, from print-job managing section 29, and obtains plural job-imposition layouts suitable for a 2-up imposition, from the table stored in storage unit 22 in advance. In this example, imposing section 30 obtains job-imposition layouts shown in FIG. 11 from the storage unit 22, and calculates the number of blank pages given after laying out pages of the plural print jobs with each of the job-imposition layouts. Imposing section 30 may extract job-imposition layouts according to predetermined rules (for example, a rule of extracting job-imposition layouts each placing a print job containing a larger number of pages at a larger number of the job-imposing positions), and calculate the number of blank pages for each of the extracted job-imposition layouts, rather than all the job-imposition layouts suitable for the imposition.

For another example, when a 4-up imposition is specified for an obtained print job in the JDF print information, imposing section 30 further obtains print jobs for which a 4-up imposition is also specified, from print-job managing section 29, and obtains plural job-imposition layouts suitable for a 4-up imposition, from the storage unit 22. In this example, imposing section 30 obtains job-imposition layouts shown in FIG. 12 from the storage unit 22, and calculates the number of blank pages given after laying out pages of the plural print jobs with each of all the job-imposition layouts shown in FIGS. 13A and 13B. Similarly to the above, imposing section 30 may extract job-imposition layouts according to predetermined rules, and calculate the number of blank pages for each of the extracted job-imposition layouts.

For another example, when a 6-up imposition is specified for an obtained print job in the JDF print information, imposing section 30 uses plural job-imposition layouts shown in FIG. 14. FIG. 15 shows the numbers of print jobs to be imposed on each sheet in job-imposition layouts for a 2-up imposition, those for a 4-up imposition and those for a 6-up imposition.

In the imposition control of the present example, imposing section 30 basically determines job-imposition layouts which make a smaller number of blank pages, among the job-imposition layouts extracted, and shows the determined job-imposition layouts to a user. However, a way to choose a job-imposition layout to be used for imposing print jobs depends on users. One user may regard a reduction of the number of blank pages as important, and another user may regard ease of a sorting process after cutting printed sheets as important. When choosing a job-imposition layout such that printed sheets given after imposing and printing print jobs need a large number of times to cut the printed sheets for separating the printed sheets into blocks of printed pages, or a job-imposition layout such that printed sheets need a large number of times to extract blank pages from the blocks (referred to as the number of blank-page extractions), it may take a long time to sort the printed pages, even if the job-imposition layouts makes a minimum number of blank pages.

In view of that, the image processing apparatus may show a user plural job-imposition layouts including a job-imposition layout which makes the smallest number of blank pages and a job-imposition layout such that the number of cuts of imposed and printed sheets or the number of blank-page extractions is small though the number of blank pages is not the smallest, so as to allow the user to choose a desired job-imposition layout from the job-imposition layouts. In the present example, there are provided the numbers of cuts of the imposed and printed sheets, which correspond to plural job-imposition layouts according to combinations of the number of print jobs to be imposed and the number of job-imposing positions per sheet, and the numbers of cuts are stored with being associated with the plural job-imposition layouts, in advance to a job imposition. The number of cuts of imposed and printed sheets is the number of times to cut imposed and printed sheets (sheets given after imposing plural print jobs with a certain job-imposition layout and printing the print jobs), needed for creating final printed products of the print jobs from the imposed and printed sheets. Imposing section 30 extracts plural job-imposition layouts the numbers of blank pages of which are smaller than those of the other job-imposition layouts. Imposing section 30 then shows a user plural job-imposition layouts including a job-imposition layout which makes the smallest number of blank pages and at least one job-imposition layout such that the number of cuts of imposed and printed sheets or the number of blank-page extractions is small though the number of blank pages is not the smallest, so as to allow the user to choose a desired job-imposition layout from the job-imposition layouts. FIGS. 16A to 16C illustrate an example of a cutting process after printing plural print jobs, and show the first cut, the second cut and the third cut, respectively. In FIGS. 16A to 16C, a cut position is indicated with a one-dot chain line. As can be seen from FIGS. 16A to 16C, the job-imposition layout for a 4-up imposition needs three times cutting, to separate the sheets given after imposing print jobs with the job-imposition layout and printing the print jobs into blocks of printed pages. If the job-imposition layout places plural print jobs at job-imposing positions prepared on two or more sheets, the number of cuts of the imposed and printed sheets can be obtained by calculating the total number of cuts needed for sets of imposed and printed sheets corresponding to the two or more sheets of the job-imposition layout.

Hereinafter, a description is given to the imposition control method used in controller 20 of the present example. CPU 21a reads the imposition control program stored in ROM 21b or storage unit 22, loads the program onto RAM 21c, and executes the program, thereby performing steps of the flowchart in FIGS. 17 and 18.

Control unit 21 (print-job managing section 29) analyzes print jobs received by print-job receiving section 28, and obtains job information (information about deadline for delivery, cost, job-imposition type and the number of pages) of each of the print jobs to manage the job information (S101).

Next, control unit 21 (imposing section 30) obtains a PDF print job and JDF print information (job ticket) from print-job managing section 29, and obtains a job-imposition type from the JDF print information (S102).

Next, control unit 21 (imposing section 30) further obtains other print jobs of the same job-imposition type from print-job managing section 29 and obtains job information of the print jobs (S103). For example, when finding a 4-up imposition specified as the job-imposition type in the job ticket obtained at S102, imposing section 30 obtains other three print jobs for which the 4-up imposition is also specified and job information of the print jobs from print-job managing section 29.

Next, control unit 21 (imposing section 30) performs an imposing process which imposes the print jobs obtained at S102 and S103. In this step, control unit 21 (imposing section 30) imposes or places the print jobs with a job-imposition layout which places the print jobs at job-imposing positions prepared on one or more sheets so that each of the job-imposing positions is not shared by two or more of the print jobs. In concrete terms, control unit 21 (imposing section 30) extracts from the table stored in storage unit 22 all the possible job-imposition layouts suitable for the obtained print jobs and the number of job-imposing positions per sheet (S104). For example, when a 4-up imposition is specified for the print jobs obtained at S102 and S103, imposing section 30 refers to a table including job-imposition layouts defined according to combinations of the number of print jobs and the number of job-imposing positions per sheet illustrated in FIGS. 13A and 13B, to extract all the job-imposition layouts for a 4-up imposition and lays out pages of the four print jobs obtained at S102 and S103 with all the extracted job-imposition layouts (S105).

Next, control unit 21 (imposing section 30) calculates the number of blank pages, and if needed, the number of blank-page extractions, for all the job-imposition layouts extracted (S106). The details of this step will be described later. In this example, control unit 21 (imposing section 30) calculates the number of blank pages and the number of blank-page extractions, for all the job-imposition layouts extracted at S104, but may perform the following operations alternatively. That is, control unit 21 (imposing section 30) may calculate the number of blank pages and the number of blank-page extractions, for job-imposition layouts chosen or extracted according to a rule, such as a rule to choose a job-imposition layouts which place a print job containing a larger number of pages at a larger number of job-imposing positions, and may omit the calculation of the number of blank pages and the number of blank-page extractions, for job-imposition layouts expected to make a larger number of blank pages (for example, job-imposition layouts to place a print job containing a smaller number of blank pages at a larger number of job-imposing positions).

Next, control unit 21 (imposing section 30) chooses plural specific job-imposition layouts the numbers of blank pages of which are smaller than those of the other job-imposition layouts, among the job-imposition layouts extracted in the above, and obtains the numbers of cuts of imposed and printed sheets for the plural specific job-imposition layouts (S107). Control unit 21 (imposing section 30) then uses display unit 26 to display an imposition control screen which shows the specific job-imposition layouts chosen, together with the corresponding numbers of blank pages, the corresponding numbers of blank-page extractions and the corresponding numbers of cuts of imposed and printed sheets, so as to prompt a user to choose a desired job-imposition layout to be used for imposing the print jobs (S108). In this step, control unit 21 (imposing section 30) may use display unit 26 to display the imposition control screen showing at least the specific job-imposition layouts the numbers of blank pages of which are smaller than those of the other job-imposition layouts. In this case, calculation of the numbers of blank-page extractions and the numbers of cuts of the imposed and printed sheets and displaying the numbers of blank pages, the numbers of blank-page extractions and the numbers of cuts of the imposed and printed sheets at S107 and S108 may be omitted.

A description is given of calculation of the number of blank pages and the number of blank-page extractions at S106 with reference to FIG. 18. The operations in this flow are executed for each sheet on which print jobs are imposed in a job-imposition layout (that is, each of one or more sheets on which print jobs are imposed or placed in a job-imposition layout).

First, control unit 21 (imposing section 30) obtains the number of job-imposing positions of each print job (S201). Next, control section 21 (imposing section 30) calculates a value obtained by dividing the number of pages in each print job with the number of job-imposing positions of the each print job in the job-imposition layout, to obtain the number of pages per position (the number of pages per job-imposing position) for each print job (S202), and define a print job such that the number of pages per position is the maximum in each sheet on which print jobs are imposed or placed in a job-imposition layout, as a representative print job (S203).

Next, control unit 21 (imposing section 30), for each sheet, sets the number of sheets for printing the representative print job, and the number of blank pages and the number of blank-page extractions of the representative print job, and sets the number of blank pages and the number of blank-page extractions of each of the remaining print job or print jobs to be imposed or placed on the each sheet. That is, control unit 21 (imposing section 30), for each sheet, judges whether the number of pages per position calculated for the representative print job is an integer (in other words, judges whether the number of pages in the representative print job is a multiple of an integer) (S204). When judging that the number of pages per position calculated for the representative print job is an integer, control unit 21 (imposing section 30) sets the number of sheets for printing the representative print job at the number judged as an integer, and further sets each of the number of blank pages and the number of blank-page extractions of the representative print job as zero (S205). On the other hand, when judging that the number of pages per position calculated for the representative print job is not an integer, control unit 21 (imposing section 30) sets the number of sheets for printing the representative print job at a value given by rounding the number of pages per position calculated for the representative print job up to an integer, and further sets each of the number of blank pages and the number of blank-page extractions of the representative print job as a value given by multiplying the number of job-imposing positions of the representative print job on the each sheet by the number of sheets for printing the representative print job and subtracting from the multiplication result the number of pages in the representative print job (S206).

Next, control unit 21 (imposing section 30) judges whether there is any other print job on the each sheet (S207). On judging that there is no other print job (one print job is laid out at all the job-imposing positions on the sheet), control unit 21 (imposing section 30) ends the operations of the imposition. On judging that there is any other print job, control unit 21 (imposing section 30) judges the number of pages per position calculated for each of the remaining print job or print jobs on the sheet is the same as the number of sheets for printing the representative print job set at S205 (S208). On judging that the number of pages per position calculated for each of the remaining print job or print jobs is the same as the number of sheets for printing the representative print job (in other words, the number of pages of the print job to be laid out at each job-imposing position is the same as the number of sheets for printing the representative print job), control unit 21 (imposing section 30) sets each of the number of blank pages and the number of blank-page extractions of the each of the remaining print job or print jobs at zero (S209). On the other hand, on judging that the number of pages per position calculated for each of the remaining print job or print jobs is not the same as the number of sheets for printing the representative print job, control unit 21 (imposing section 30) calculate a value given by multiplying the number of job-imposing positions of the each of the remaining print job or print jobs on the sheet by the number of sheets for printing the representative print job and subtracting from the multiplication result the number of pages in the each of the remaining print job or print jobs, and set the number of blank pages of the each of the remaining print job or print jobs at the calculated value. Control unit 21 (imposing section 30) then judges whether the above number of blank pages is greater than the number of job-imposing positions of the each of the remaining print job or print jobs on the sheet, so as to set the number of blank-page extractions of the each of the remaining print job or print jobs. On judging that the above number of blank pages is greater than the number of job-imposing positions, control unit 21 (imposing section 30) sets the number of blank-page extractions at the number of job-imposing positions. On judging that the number of blank pages is not greater than the number of job-imposing positions, control unit 21 (imposing section 30) sets the number of blank-page extractions at the number of blank pages (S210).

After that, control unit 21 (imposing section 30) adds up the numbers of blank pages of all the print jobs (the representative print job and the remaining print job or print jobs) on each sheet and adding up the numbers of blank-page extractions of all the print jobs on each sheet (S211). After executing operations in the above flow for each of one or more sheets of each job-imposition layout, control unit 21 (imposing section 30) can calculate the total number of blank pages and the total number blank-page extractions for each job-imposition layout.

The above operations are described by using a concrete example that print jobs A to D are imposed with a 4-up job-imposition layout, where print job A contains 200 pages, print job B contains 150 pages, print job C contains 65 pages and print job D contains 45 pages. In the imposition of print jobs A to D, the print jobs are placed at four job-imposing positions prepared on each of one or more sheets so that each of the job-imposing positions is not shared by two or more of the print jobs (in other words, each of the job-imposing positions is occupied by only one print job) and that each print job is not placed at job-imposing positions on separated sheets. In this imposition, control unit 21 (imposing section 30) may calculate the numbers of blank pages and the numbers of blank-page extractions for all the possible job-imposition layouts illustrated in FIGS. 13A and 13B. However, it is expected that a job-imposition layout which places a print job containing a larger number of pages at a smaller number of the job-imposing positions makes a larger number of blank pages. Therefore, further applying a rule of placing a print job containing a larger number of pages at a larger number of the job-imposing positions to the imposition, control unit 21 (imposing section 30) may extract job-imposition layouts following the rule from all the possible job-imposition layouts, and then calculate the numbers of blank pages and the numbers of blank-page extractions only for the extracted job-imposition layouts. FIGS. 19 to 23 show the numbers of blank pages, the numbers of blank-page extractions and the number of cuts of imposed and printed sheets given after laying out pages of the print jobs with each of several job-imposition layouts (job-imposition layouts 1 to 5) among the job-imposition layouts shown in FIGS. 13A and 13B.

As illustrated in FIG. 13A, there is only one job-imposition layout (job-imposition layout 1 shown in FIG. 19) to place all the four print job on one sheet in all the possible job-imposition layout. In job-imposition layout 1, the numbers of pages per position calculated at S202 are 200 (=200/1) for print job A, 150 (=150/1) for print job B, 65 (=65/1) for print job C and 45 (=45/1) for print job D. Therefore, print job A is defined as a representative print job for sheet 1 at S203. Since the number of pages per position calculated for print job A is an integer (YES at S204), the number of sheets for printing print job A is set at 200 at S205 and each of the number of blank pages and the number of blank-pages extractions is set at zero for print job A.

As for print job B, since the number of pages per position calculated for print job B is smaller than the number of sheets for printing the representative print job (NO at S208), the number of job-imposing positions on the sheet is 1, the number of sheets for printing the representative print job is 200 and the number of pages is 150, the number of blank pages is set at 50 (=1×200−150) at S210. The number of blank-page extractions of print job B is set at 1, since the number of blank pages set at S210 is greater than the number of job-imposing positions of print job B on the sheet. Similarly, for print job C, the number of blank pages is set at 135 and the number of blank-page extractions is set at 1; and, for print job D, the number of blank pages is set at 155 and the number of blank-page extractions is set at 1. As a result, at S211, the number of blank pages of the job-imposition layout 1 becomes 340 (=0+50+135+155), the number of blank-page extractions of the job-imposition layout 1 becomes 3 (=0+1+1+1), and the number of cuts becomes 3.

As another example, there are twelve job-imposition layouts to place three print job on one sheet and one print job on the other sheet, as shown in FIG. 13A. Among these job-imposition layouts, job-imposition layout 2 shown in FIG. 20 places print jobs A to D so that 'the number of job-imposing positions of print job A'≥'the number of job-imposing positions of print job B'≥'the number of job-imposing positions of print job C'≥'the number of job-imposing positions of print job D' holds. In job-imposition layout 2, the numbers of pages per position calculated at S202 are 50 (=200/4) for print job A, 75 (=150/2) for print job B, 65 (=65/1) for print job C and 45 (=45/1) for print job D. Therefore, print job B is defined as a representative print job for sheet 1 and print job A is defined as a representative print job for sheet 2, at S203. As for sheet 2, since the number of pages per position calculated for print job A is an integer (YES at S204), the number of sheets for printing print job A is set at 50 at S205 and each of the number of blank pages and the number of blank-pages extractions is set at zero for print job A.

As for sheet 1, since the number of pages per position calculated for print job B is an integer (YES at S204), the number of sheets for printing print job B is set at 75 at S205 and each of the number of blank pages and the number of blank-pages extractions is set at zero for print job B. As for print job C, since the number of pages per position calculated for print job C is smaller than the number of sheets for printing the representative print job (NO at S208), the number of job-imposing positions on the sheet is 1, the number of sheets for printing the representative print job is 75 and the number of pages is 65, the number of blank pages is set at 10 (=1×75−65) at S210. The number of blank-page extractions of print job C is set at 1, since the number of blank pages set at S210 is greater than the number of job-imposing positions of print job C on the sheet. Similarly, for print job D, the number of blank pages is set at 30 and the number of blank-page extractions is set at 1. As a result, at S211, the number of blank pages of the job-imposition layout 2 becomes 40 (=0+0+10+30), the number of blank-page extractions of the job-imposition layout 2 becomes 2 (=0+0+1+1), and the number of cuts becomes 6 (=3×2).

As another example, there are twenty-seven job-imposition layouts to place two print job on one sheet and two print jobs on the other sheet, as shown in FIG. 13A. Among these job-imposition layouts, there are six job-imposition layouts each of which places print jobs A to D so that 'the number of job-imposing positions of print job A'≥'the number of job-imposing positions of print job B'≥'the number of job-imposing positions of print job C'≥'the number of job-imposing positions of print job D' holds, which are sets of first sheet and second sheet tied with a thick line in FIG. 13A. FIG. 21 illustrates one of the six job-imposition layouts (job-imposition layout 3). In job-imposition layout 3, the numbers of pages per position calculated at S202 are 66.7 (=200/3) for print job A, 50 (=150/3) for print job B, 65 (=65/1) for print job C and 45 (=45/1) for print job D. Therefore, print job A is defined as a representative print job for sheet 1 and print job B is defined as a representative print job for sheet 2, at S203. As for sheet 1, since the number of pages per position calculated for print job A is not an integer (NO at S204), the number of sheets for printing print job A is set at 67, which is given by rounding the numbers of pages per position up to an integer, at S205. Further, since the number of job-imposing positions on the sheet is 3, the number of sheets for printing the representative print job is 67 and the number of pages is 200, each of the number of blank pages and the number of blank-pages extractions is set at 1 (=3×67−200) for print job A. As for print job C, since the number of pages per position calculated for print job C is smaller than the number of sheets for printing the representative print job (NO at S208), the number of job-imposing positions on the sheet is 1, the number of sheets for printing the representative print job is 67 and the number of pages is 65, the number of blank pages is set at 2 (=1×67−65) and the number of blank-page extractions is set at 1, at S210.

As for sheet 2, since the number of pages per position calculated for print job B is an integer (YES at S204), the number of sheets for printing print job B is set at 50 at S205 and each of the number of blank pages and the number of blank-pages extractions is set at zero for print job B. As for print job D, since the number of pages per position calculated for print job D is smaller than the number of sheets for printing the representative print job (NO at S208), the number of job-imposing positions on the sheet is 1, the number of sheets for printing the representative print job is 50 and the number of pages is 45, the number of blank pages is set at 5 (=1×50−45) and the number of blank-page extractions is set at 1, at S210. As a result, at S211, the number of blank pages of the job-imposition layout 3 becomes 8 (=1+2+0+5), the number of blank-page extractions of the job-imposition layout 3 becomes 3 (=1+1+0+1), and the number of cuts becomes 6 (=3×2).

As another example, there are eighteen job-imposition layouts to place two print job on one sheet, one print job on another sheet and one print job on the other sheet, as shown in FIG. 13B. Among these job-imposition layouts, there are two job-imposition layouts each of which places print jobs A to D so that 'the number of job-imposing positions of print job A'≥'the number of job-imposing positions of print job B'≥'the number of job-imposing positions of print job C'≥'the number of job-imposing positions of print job D' holds, which are sets of first sheet and second sheet surrounded with a thick line in FIG. 13B. FIG. 22 illustrates one of the two job-imposition layouts (job-imposition layout 4). In job-imposition layout 4, the numbers of pages per position calculated at S202 are 50 (=200/4) for print job A, 37.5 (=150/4) for print job B, 32.5 (=65/2) for print job C and 22.5 (=45/2) for print job D. Therefore, print job C is defined as a representative print job for sheet 1, print job A is defined as a representative print job for sheet 2, and print job B is defined as a representative print job for sheet 3, at S203. As for sheet 2, since the number of pages per position calculated for print job A is an integer (YES at S204), the number of sheets for printing print job A is set at 50 at S205 and each of the number of blank pages and the number of blank-pages extractions is set at zero for print job A. As for sheet 3, since the number of pages per position calculated for print job B is not an integer (NO at S204), the number of sheets for printing print job B is set at 38, which is given by rounding the numbers of pages per position up to an integer, at S205. Further, since the number of job-imposing positions on the sheet is 4, the number of sheets for printing the representative print job is 38 and the number of pages is 150, each of the number of blank pages and the number of blank-pages extractions is set at 2 (=4×38−150) for print job B.

As for sheet 1, since the number of pages per position calculated for print job C is not an integer (NO at S204), the number of sheets for printing print job C is set at 33, which is given by rounding the numbers of pages per position up to an integer, at S205. Further, since the number of job-imposing positions on the sheet is 2, the number of sheets for printing the representative print job is 33 and the number of pages is 65, each of the number of blank pages and the number of blank-pages extractions is set at 1 (=2×33−65) for print job C. As for print job D, since the number of pages per position calculated for print job D is smaller than the number of sheets for printing the representative print job (NO at S208), the number of job-imposing positions on the sheet is 2, the number of sheets for printing the representative print job is 33 and the number of pages is 45, the number of blank pages is set at 21 (=2×33−45) and the number of blank-page extractions is set at 2, at S210. As a result, at S211, the number of blank pages of the job-imposition layout 4 becomes 24 (=0+2+1+21), the number of blank-page extractions of the job-imposition layout 4 becomes 5 (=0+2+1+2), and the number of cuts becomes 9 (=3×3).

As another example, there is only one job-imposition layout to place one print job on one sheet as shown in FIG. 13B. FIG. 23 illustrates this job-imposition layout (job-imposition layout 5). In job-imposition layout 5, the numbers of pages per position calculated at S202 are 50 (=200/4) for print job A, 37.5 (=150/4) for print job B, 16.25 (=65/4) for print job C and 11.25 (=45/4) for print job D. Since the number of pages per position calculated for print job A is an integer (YES at S204), the number of sheets for printing print job A is set at 50 at S205 and each of the number of blank pages and the number of blank-pages extractions is set at zero for print job A. Since the number of pages per position calculated for print job B is not an integer (NO at S204), the number of sheets for printing print job B is set at 38, which is given by rounding the numbers of pages per position up to an integer, at S205. Further, since the number of job-imposing positions on the sheet is 4, the number of sheets for printing the representative print job is 38 and the number of pages is 150, each of the number of blank pages and the number of blank-pages extractions is set at 2 (=4×38−150) for print job B. Similarly, the number of sheets for printing print job C is set at 17. Further, since the number of job-imposing positions on the sheet is 4, the number of sheets for printing the representative print job is 17 and the number of pages is 65, each of the number of blank pages and the number of blank-pages extractions is set at 3 (=4×17−65) for print job C. As for the print job D, the number of sheets for printing print job D is set at 12. Further, since the number of job-imposing positions on the sheet is 4, the number of sheets for printing the representative print job is 12 and the number of pages is 45, each of the number of blank pages and the number of blank-pages extractions is set at 3 (=4×12−45) for print job D. As a result, at S211, the number of blank pages of the job-imposition layout 5 becomes 8 (=0+2+3+3), the number of blank-page extractions of the job-imposition layout 5 becomes 8 (=0+2+3+3), and the number of cuts becomes 12 (=3×4).

The above examples can be generalized as follows. The job imposition includes defining the number of sheets where plural print jobs are to be imposed or placed, defining the number of print jobs to be placed on each sheet and the number of job-imposing positions of each print job on each sheet, and then performing the following operations for each sheet. The operations includes (1) calculating the number of pages per position for each print job, by dividing the number of pages in each print job with the number of job-imposing positions of the each print job; (2) defining a print job such that the number of pages per position is maximum among print jobs to be placed on each sheet as a representative print job; (3) setting, for the representative print job defined for each sheet, the number of sheets for printing the representative print job, the number of blank pages and the number of blank-page extractions, according to whether or not the number of pages per position calculated for the representative print job is an integer; (4) setting, for each of the remaining print job or print jobs to be placed on the each sheet, the number of blank pages and the number of blank-page extractions, according to whether or not the number of pages per position calculated for the each of the remaining print job or print jobs is same as the number of sheets for printing the representative print job; (5) adding up the numbers of blank pages of all the print jobs (the representative print job and the remaining print job or print jobs) to be placed on each sheet and adding up the numbers of blank-page extractions of all the print jobs to be placed on each sheet; and (6) calculating the total number of blank pages and the total number blank-page extractions of all the sheet or sheets of the job-imposition layout, and setting the number of cuts of imposed and printed sheets on the basis of the number of sheets of the job-imposition layout.

In the above examples, the number of blank pages of job-imposition layout 3 is 8, which is the smallest among those of the above-described job-imposition layouts, the number of blank-page extractions and the number of cuts of job-imposition layout 3 is 3 and 6, respectively. On the other hand, the number of blank pages of job-imposition layout 2 is 40, which is the greater than that of job-imposition layout 3, but the number of blank-page extractions and the number of cuts of job-imposition layout 2 is 2 and 6, respectively, wherein the number of blank-page extractions of job-imposition layout 2 is smaller than that of job-imposition layout 3. If a user regards a reduction of the number of blank pages as important, the user will prefer job-imposition layout 3 (or job-imposition layout 5 and job-imposition layout 4). However, if a user regards ease of a sorting process after cutting printed sheets as important, the user will prefer job-imposition layout 2. The way to choose one of the job-imposition layouts depends on users.

In view of that the imposition control of the present example, the image processing apparatus is configured to use display unit 26 to display plural job-imposition layouts including a job-imposition layout such that the number of blank pages is the minimum, and at least one job-imposition layout such that the number of blank pages is not the minimum but the number of blank-page extractions or the number of cuts of imposed and printed sheets is smaller than those of the other job-imposition layouts. FIG. 24 illustrates an example of imposition control screen 60. The imposition control screen 60 indicates job-imposition layout 1 such that the number of blank pages is the minimum and job-imposition layout 2 such that the number of blank pages is not the minimum but the number of blank-page extractions is smaller than those of other job-imposition layouts, so as to allow a user to choose one of job-imposition layouts 1 and 2.

As described above, an image processing apparatus according to an embodiment of the present invention, is configured to, when a process of imposing and printing plural print jobs is instructed, perform the following operations. The image processing apparatus uses the table including job-imposition layouts defined according to combinations of the number of print jobs to be imposed and the number of job-imposing positions per sheet, to extract from the table a plurality of job-imposition layouts suitable for imposing the plurality of print jobs of the same job-imposition type. The image processing apparatus calculates the number of blank pages to be given after laying out pages of the plurality of print jobs with each of the plurality of job-imposition layouts extracted (and optionally, further calculates the number of blank-sheet extractions and the number of cuts of imposed and printed sheets). The image processing apparatus then determines specific job-imposition layouts the numbers of blank pages of which are smaller than the numbers of blank pages of the other job-imposition layouts, among the plurality of job-imposition layouts extracted. The image processing apparatus uses a display unit to display the specific job-imposition layouts so as to allow a user to choose a job-imposition layout to be used for imposing the plurality of print jobs, from the specific job-imposition layouts. The specific job-imposition layouts includes a job-imposition layout such that the number of blank pages is the minimum, and at least one job-imposition layout such that the number of blank pages is smaller than those of the other job-imposition layouts and the number of blank-page extractions or the number of cuts of imposed and printed sheets is the minimum. According to the imposition control executed by the image processing apparatus, it is possible to perform an efficient process of imposing multiple print jobs, with no need for a complicated sorting process after cutting sheets on which the multiple print jobs were imposed and printed and with a reduced number of blank pages.

Incidentally, the present invention should not be limited to an above-mentioned embodiments and examples, and the constitution and control of the system and each of the devices may be modified appropriately unless the modification deviates from the spirit of the present invention.

For example, the above-mentioned embodiments and examples use job-imposition layouts for 2-up imposition, 4-up imposition and 6-up imposition. The job imposition method can be applied similarly to other job-imposition layouts each placing print jobs at an even number of job-imposing positions prepared on one or more sheet for job layout.

Further, in the above-mentioned embodiments and examples, imposition control screen 60 indicates two job-imposition layouts to be chosen by a user. Alternatively, imposition control screen 60 may indicate three or more job-imposition layouts or may indicate only one job-imposition layout if there is a job-imposition layout such that all the number of blank pages, the number of blank-page extractions and the number of cuts are the maximum among the job-imposition layout extracted.

The present invention is applicable to image processing apparatuses for use in a printing system configured to impose and print multiple print jobs, non-transitory computer-readable storage media each storing the imposition control program, and imposition control methods.

The invention claimed is:

1. An image processing apparatus comprising:
   a storage unit storing a table including job-imposition layouts defined according to combinations of the number of print jobs to be imposed and the number of job-imposing positions per sheet;
   a display unit; and
   a hardware processor that performs operations comprising receiving print jobs,
      analyzing the print jobs to obtain job information of each of the print jobs, the job information including a job-imposition type specified for the each of the print jobs and the number of pages in the each of the print jobs, and
      imposing a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs,
   wherein the imposing includes,
      using the table stored in the storage unit to extract from the table a plurality of job-imposition layouts suitable for imposing the plurality of print jobs of the same job-imposition type,
      calculating the number of blank pages to be given after laying out pages of the plurality of print jobs with each of the plurality of job-imposition layouts extracted,
      determining specific job-imposition layouts the numbers of blank pages of which are smaller than the numbers of blank pages of the other job-imposition layouts, among the plurality of job-imposition layouts extracted, and
      using the display unit to display the specific job-imposition layouts so as to allow a user to choose a job-imposition layout to be used for imposing the plurality of print jobs, from the specific job-imposition layouts.

2. The image processing apparatus of claim 1,
   wherein the imposing further includes extracting job-imposition layouts each of which places a print job containing a larger number of pages at a larger number of the job-imposing positions, from the plurality of job-imposition layouts suitable for imposing the plurality of print jobs of the same job-imposition type.

3. The image processing apparatus of claim 1,
   wherein the imposing further includes,
      on calculating the number of blank pages, calculating the number of cuts of imposed and printed sheets and the number of blank-page extractions, for each of the job-imposition layouts extracted, wherein the number of cuts is the number of times to cut the imposed and printed sheets needed for separating the imposed and printed sheets into blocks of printed pages of the plurality of print jobs, and the number of blank-page extractions is the number of times to extract blank pages from the blocks, and
      using the display unit to display the numbers of blank pages, the numbers of cuts and the numbers of blank-page extractions calculated for the specific job-imposition layouts, together with the specific job-imposition layouts.

4. The image processing apparatus of claim 3,
   wherein the imposing includes, for each of the job-imposition layouts extracted,
      calculating the number of pages per position for each of the plurality of print jobs, by dividing the number of pages in each of the plurality of print jobs with the number of job-imposing positions of the each of the plurality of print jobs in the each of the job-imposition layouts extracted,
      defining a representative print job for each of the one or more sheets in each of the job-imposition layouts extracted, wherein the representative print job is a print job such that the number of pages per position is maximum among print jobs to be placed on the each of the one or more sheets,
      setting, for the representative print job defined for each of the one or more sheets, the number of sheets for printing the representative print job, the number of blank pages and the number of blank-page extractions, according to whether or not the number of pages per position calculated for the representative print job is an integer,
      setting, for each of the remaining print job or print jobs to be placed on each of the one or more sheets, the number of blank pages and the number of blank-page extractions, according to whether or not the number of pages per position calculated for the each of the remaining print job or print jobs is same as the number of sheets for printing the representative print job, and
      calculating the number of blank pages and the number blank-page extractions for each of the job-imposition layouts extracted, by adding up the numbers of blank pages of the representative print job and the remaining print job or print jobs to be placed on each of the one or more sheets and adding up the numbers of blank-page extractions of the representative print job and the remaining print job or print jobs to be placed on each of the one or more sheets.

5. The image processing apparatus of claim 4,
   wherein the setting, for the representative print job defined for each of the one or more sheets, the number of sheets for printing the representative print job, the number of blank pages and the number of blank-page extractions, includes
      on judging that the number of pages per position calculated for the representative print job is an integer, setting the number of sheets for printing the representative print job at the number of pages per position calculated for the representative print job and setting each of the number of blank pages and the number of blank-page extractions at zero, and on judging that the number of pages per position calculated for the representative print job is not an integer, setting the number of sheets for printing the representative print job at a value given by rounding the number of pages per position calculated for the representative print job up to an integer, and setting each of the number of blank pages and the number of blank-page extractions at a value given by multiplying the number of job-imposing positions of the representative print job on the each of the one or more sheets by the number of sheets for printing the representative print job and subtracting from a multiplication result the number of pages in the representative print job.

6. The image processing apparatus of claim 4,
wherein the setting, for each of the remaining print job or print jobs to be placed on each of the one or more sheets, the number of blank pages and the number of blank-page extractions, includes
on judging that the number of pages per position calculated for the each of the remaining print job or print jobs is same as the number of sheets for printing the representative print job, setting each of the number of blank pages and the number of blank-page extractions at zero, and
on judging that the number of pages per position calculated for the each of the remaining print job or print jobs is not same as the number of sheets for printing the representative print job,
setting the number of blank pages at a value given by multiplying the number of job-imposing positions of the each of the remaining print job or print jobs on the each of the one or more sheets by the number of sheets for printing the representative print job and subtracting from a multiplication result the number of pages in the each of the remaining print job or print jobs,
judging whether the number of blank pages of the each of the remaining print job or print jobs is greater than the number of job-imposing positions of the each of the remaining print job or print jobs on the each of the one or more sheets,
on judging that the number of blank pages is greater than the number of job-imposing positions, setting the number of blank-page extractions at the number of job-imposing positions, and
on judging that the number of blank pages is not greater than the number of job-imposing positions, setting the number of blank-page extractions at the number of blank pages.

7. A non-transitory computer-readable storage medium storing an imposition control program, the imposition control program comprising instructions which, when executed by a hardware processor of an image processing apparatus, cause the image processing apparatus to perform operations, the image processing apparatus including a storage unit and a display unit and being configured to impose a plurality of print jobs and output data of print images of the plurality of print jobs, the storage unit storing a table including job-imposition layouts defined according to combinations of the number of print jobs to be imposed and the number of job-imposing positions per sheet,
the operations comprising:
analyzing print jobs to obtain job information of each of the print job, the job information including a job-imposition type specified for the each of the print jobs and the number of pages in the each of the print jobs, and
imposing a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs,
wherein the imposing includes,
using the table stored in the storage unit to extract from the table a plurality of job-imposition layouts suitable for imposing the plurality of print jobs of the same job-imposition type,
calculating the number of blank pages to be given after laying out pages of the plurality of print jobs with each of the plurality of job-imposition layouts extracted,
determining specific job-imposition layouts the numbers of blank pages of which are smaller than the numbers of blank pages of the other job-imposition layouts, among the plurality of job-imposition layouts extracted, and
using the display unit to display the specific job-imposition layouts so as to allow a user to choose a job-imposition layout to be used for imposing the plurality of print jobs, from the specific job-imposition layouts.

8. The non-transitory computer-readable storage medium of claim 7,
wherein the imposing further includes extracting job-imposition layouts each of which places a print job containing a larger number of pages at a larger number of the job-imposing positions, from the plurality of job-imposition layouts suitable for imposing the plurality of print jobs of the same job-imposition type.

9. The non-transitory computer-readable storage medium of claim 7,
wherein the imposing further includes,
on calculating the number of blank pages, calculating the number of cuts of imposed and printed sheets and the number of blank-page extractions, for each of the job-imposition layouts extracted, wherein the number of cuts is the number of times to cut the imposed and printed sheets needed for separating the imposed and printed sheets into blocks of printed pages of the plurality of print jobs, and the number of blank-page extractions is the number of times to extract blank pages from the blocks, and
using the display unit to display the numbers of blank pages, the numbers of cuts and the numbers of blank-page extractions calculated for the specific job-imposition layouts, together with the specific job-imposition layouts.

10. The non-transitory computer-readable storage medium of claim 9,
wherein the imposing includes, for each of the job-imposition layouts extracted,
calculating the number of pages per position for each of the plurality of print jobs, by dividing the number of pages in each of the plurality of print jobs with the number of job-imposing positions of the each of the plurality of print jobs in the each of the job-imposition layouts extracted,
defining a representative print job for each of the one or more sheets in each of the job-imposition layouts extracted, wherein the representative print job is a print job such that the number of pages per position is maximum among print jobs to be placed on the each of the one or more sheets, setting, for the representative print job defined for each of the one or more sheets, the number of sheets for printing the representative print job, the number of blank pages and the number of blank-page extractions, according to whether or not the number of pages per position calculated for the representative print job is an integer, setting, for each of the remaining print job or print jobs to be placed on each of the one or more sheets, the number of blank pages and the number of blank-page extractions, according to whether or not the number of pages per position calculated for the each of the remaining print job or print jobs is same as the number of sheets for printing the representative print job, and calculating the number of blank pages and the number blank-page extractions for each of the job-imposition layouts extracted, by adding up the numbers of blank pages of the representative print job and the remaining print job or print jobs to be placed on each of the one or more sheets and adding up the numbers of blank-page extractions of the representative print job and the remaining print job or print jobs to be placed on each of the one or more sheets.

11. The non-transitory computer-readable storage medium of claim 10, wherein the setting, for the representative print job defined for each of the one or more sheets, the number of sheets for printing the representative print job, the number of blank pages and the number of blank-page extractions, includes on judging that the number of pages per position calculated for the representative print job is an integer, setting the number of sheets for printing the representative print job at the number of pages per position calculated for the representative print job and setting each of the number of blank pages and the number of blank-page extractions at zero, and on judging that the number of pages per position calculated for the representative print job is not an integer, setting the number of sheets for printing the representative print job at a value given by rounding the number of pages per position calculated for the representative print job up to an integer, and setting each of the number of blank pages and the number of blank-page extractions at a value given by multiplying the number of job-imposing positions of the representative print job on the each of the one or more sheets by the number of sheets for printing the representative print job and subtracting from a multiplication result the number of pages in the representative print job.

12. The non-transitory computer-readable storage medium of claim 10, wherein the setting, for each of the remaining print job or print jobs to be placed on each of the one or more sheets, the number of blank pages and the number of blank-page extractions, includes on judging that the number of pages per position calculated for the each of the remaining print job or print jobs is same as the number of sheets for printing the representative print job, setting each of the number of blank pages and the number of blank-page extractions at zero, and on judging that the number of pages per position calculated for the each of the remaining print job or print jobs is not same as the number of sheets for printing the representative print job, setting the number of blank pages at a value given by multiplying the number of job-imposing positions of the each of the remaining print job or print jobs on the each of the one or more sheets by the number of sheets for printing the representative print job and subtracting from a multiplication result the number of pages in the each of the remaining print job or print jobs, judging whether the number of blank pages of the each of the remaining print job or print jobs is greater than the number of job-imposing positions of the each of the remaining print job or print jobs on the each of the one or more sheets, on judging that the number of blank pages is greater than the number of job-imposing positions, setting the number of blank-page extractions at the number of job-imposing positions, and on judging that the number of blank pages is not greater than the number of job-imposing positions, setting the number of blank-page extractions at the number of blank pages.

13. An imposition control method for use in a printing system including an image processing apparatus configured to impose a plurality of print jobs and output data of print images of the plurality of print jobs and an image forming apparatus configured to perform printing on a basis of the data of print images, the image processing apparatus including a storage unit and a display unit, the storage unit storing a table including job-imposition layouts defined according to combinations of the number of print jobs to be imposed and the number of job-imposing positions per sheet, the method comprising:

analyzing, by the image processing apparatus, print jobs to obtain job information of each of the print job, the job information including a job-imposition type specified for the each of the print jobs and the number of pages in the each of the print jobs, and imposing, by the image processing apparatus, a plurality of print jobs of a same job-imposition type among the print jobs analyzed, with a job-imposition layout which places the plurality of print jobs at job-imposing positions prepared on one or more sheets so that each of the job-imposing positions is not shared by two or more of the plurality of print jobs, wherein the imposing includes, using the table stored in the storage unit to extract from the table a plurality of job-imposition layouts suitable for imposing the plurality of print jobs of the same job-imposition type, calculating the number of blank pages to be given after laying out pages of the plurality of print jobs with each of the plurality of job-imposition layouts extracted, determining specific job-imposition layouts the numbers of blank pages of which are smaller than the numbers of blank pages of the other job-imposition layouts, among the plurality of job-imposition layouts extracted, and using the display unit to display the specific job-imposition layouts so as to allow a user to choose a job-imposition layout to be used for imposing the plurality of print jobs, from the specific job-imposition layouts.

14. The imposition control method of claim 13, wherein the imposing further includes extracting job-imposition layouts each of which places a print job containing a larger number of pages at a larger number of the job-imposing positions, from the plurality of job-imposition layouts suitable for imposing the plurality of print jobs of the same job-imposition type.

15. The imposition control method of claim 13, wherein the imposing further includes,
    on calculating the number of blank pages, calculating the number of cuts of imposed and printed sheets and the number of blank-page extractions, for each of the job-imposition layouts extracted, wherein the number of cuts is the number of times to cut the imposed and printed sheets needed for separating the imposed and printed sheets into blocks of printed pages of the plurality of print jobs, and the number of blank-page extractions is the number of times to extract blank pages from the blocks, and
    using the display unit to display the numbers of blank pages, the numbers of cuts and the numbers of blank-page extractions calculated for the specific job-imposition layouts, together with the specific job-imposition layouts.

16. The imposition control method of claim 15, wherein the imposing includes, for each of the job-imposition layouts extracted,
    calculating the number of pages per position for each of the plurality of print jobs, by dividing the number of pages in each of the plurality of print jobs with the number of job-imposing positions of the each of the plurality of print jobs in the each of the job-imposition layouts extracted,
    defining a representative print job for each of the one or more sheets in each of the job-imposition layouts extracted, wherein the representative print job is a print job such that the number of pages per position is maximum among print jobs to be placed on the each of the one or more sheets,
    setting, for the representative print job defined for each of the one or more sheets, the number of sheets for printing the representative print job, the number of blank pages and the number of blank-page extractions, according to whether or not the number of pages per position calculated for the representative print job is an integer,
    setting, for each of the remaining print job or print jobs to be placed on each of the one or more sheets, the number of blank pages and the number of blank-page extractions, according to whether or not the number of pages per position calculated for the each of the remaining print job or print jobs is same as the number of sheets for printing the representative print job, and
    calculating the number of blank pages and the number blank-page extractions for each of the job-imposition layouts extracted, by adding up the numbers of blank pages of the representative print job and the remaining print job or print jobs to be placed on each of the one or more sheets and adding up the numbers of blank-page extractions of the representative print job and the remaining print job or print jobs to be placed on each of the one or more sheets.

17. The imposition control method of claim 16, wherein the setting, for the representative print job defined for each of the one or more sheets, the number of sheets for printing the representative print job, the number of blank pages and the number of blank-page extractions, includes
    on judging that the number of pages per position calculated for the representative print job is an integer, setting the number of sheets for printing the representative print job at the number of pages per position calculated for the representative print job and setting each of the number of blank pages and the number of blank-page extractions at zero, and
    on judging that the number of pages per position calculated for the representative print job is not an integer, setting the number of sheets for printing the representative print job at a value given by rounding the number of pages per position calculated for the representative print job up to an integer, and setting each of the number of blank pages and the number of blank-page extractions at a value given by multiplying the number of job-imposing positions of the representative print job on the each of the one or more sheets by the number of sheets for printing the representative print job and subtracting from a multiplication result the number of pages in the representative print job.

18. The imposition control method of claim 16, wherein the setting, for each of the remaining print job or print jobs to be placed on each of the one or more sheets, the number of blank pages and the number of blank-page extractions, includes
    on judging that the number of pages per position calculated for the each of the remaining print job or print jobs is same as the number of sheets for printing the representative print job, setting each of the number of blank pages and the number of blank-page extractions at zero, and
    on judging that the number of pages per position calculated for the each of the remaining print job or print jobs is not same as the number of sheets for printing the representative print job,
        setting the number of blank pages at a value given by multiplying the number of job-imposing positions of the each of the remaining print job or print jobs on the each of the one or more sheets by the number of sheets for printing the representative print job and subtracting from a multiplication result the number of pages in the each of the remaining print job or print jobs,
        judging whether the number of blank pages of the each of the remaining print job or print jobs is greater than the number of job-imposing positions of the each of the remaining print job or print jobs on the each of the one or more sheets,
        on judging that the number of blank pages is greater than the number of job-imposing positions, setting the number of blank-page extractions at the number of job-imposing positions, and
        on judging that the number of blank pages is not greater than the number of job-imposing positions, setting the number of blank-page extractions at the number of blank pages.

* * * * *